Feb. 6, 1962 E. H. GATZERT 3,020,347

PREPAY PAYSTATION TELEPHONE SYSTEM

Filed Oct. 16, 1958 13 Sheets-Sheet 1

INVENTOR
ERNEST H. GATZERT
BY [signature]
ATTORNEY

Feb. 6, 1962 E. H. GATZERT 3,020,347

PREPAY PAYSTATION TELEPHONE SYSTEM

Filed Oct. 16, 1958 13 Sheets-Sheet 3

Feb. 6, 1962 E. H. GATZERT 3,020,347

PREPAY PAYSTATION TELEPHONE SYSTEM

Filed Oct. 16, 1958 13 Sheets-Sheet 4

Feb. 6, 1962 E. H. GATZERT 3,020,347

PREPAY PAYSTATION TELEPHONE SYSTEM

Filed Oct. 16, 1958 13 Sheets-Sheet 7

Feb. 6, 1962 E. H. GATZERT 3,020,347

PREPAY PAYSTATION TELEPHONE SYSTEM

Filed Oct. 16, 1958 13 Sheets-Sheet 10

Feb. 6, 1962 E. H. GATZERT 3,020,347

PREPAY PAYSTATION TELEPHONE SYSTEM

Filed Oct. 16, 1958 13 Sheets-Sheet 13

United States Patent Office 3,020,347

Patented Feb. 6, 1962

3,020,347

PREPAY PAYSTATION TELEPHONE SYSTEM

Ernest H. Gatzert, Rochester, N.Y., assignor to General Dynamics Corporation, Rochester, N.Y., a corporation of Delaware Filed Oct. 16, 1958, Ser. No. 767,529
7 Claims. (Cl. 179—6.3)

This invention relates to telephone systems and particularly to such systems adapted to provide service from regular calling dial stations or from paystations where the deposit of a coin is required before the dial selective apparatus may be allowed to function.

The object of the invention is to provide means in the form of an adapter circuit individual to a calling station for rendering service to a prepay paystation circuit over a long line, otherwise not certainly capable of precise, accurate and satisfactory operation in such a dial system.

The invention consists primarily of a long line adapter circuit for insertion in a long line and before the conventional line circuit thereof and a pad added to the conventional paystation adapter circuit. The said pad circuit contains means to identify the nature of the calling line, that is to note whether the calling station is on a regular line, on a prepay paystation line, or on a long line serving a prepay paystation circuit.

If the incoming call is from a regular station, then no operation whatsoever will take place in the paystation adapter circuit and the apparatus will function as though the linefinder was coupled directly to the selector in the conventional manner.

If the incoming call is from a paystation, then a paystation relay in the said pad circuit will operate and prepare means to deny service to such paystation until a coin has been deposited, this means being in the paystation adapter circuit. If the call is incoming over a long line, then an additional relay in the said pad circuit is operated to nullify the said operation of the paystation relay so that dial pulses may be passed freely through this paystation adapter circuit to succeeding apparatus but at the same time a signal is returned to the long line circuit to cause this circuit to take over the function of denying service until a coin has been deposited.

In the paystation adapter circuit a coin deposit relay, unoperated, causes the dialing contacts therein to remain inert and unresponsive to incoming dial pulses so that the connection cannot be extended until a coin has been deposited. When the long line adapter circuit is used, then another relay in this circuit is operated to perform the function of the coin deposit relay and the paystation adapter circuit dial contacts are enabled but other means in the long line circuit is employed to block any impulses from reaching the paystation adapter circuit.

A feature of the long line circuit is the use of a marginal relay which will not operate if a coin has not been deposited at the calling station but will operate when such coin has been deposited. As long as this marginal relay remains unoperated, the distant selector reached through the paystation adapter circuit may be seized but not operated. When a coin is deposited, this marginal relay is operated and the dialing contacts therein are enabled.

Another feature of the invention is the use of a pulse correction circuit, which is blocked from operation by the unoperated coin deposit relay but which is enabled upon the deposit of a coin.

Another feature of the invention is a connector having means to serve or make connections to regular called lines or to paystation called lines, all of which may be grouped on one or more levels of the connector. When the connector is driven to such a level it will act at the time of release to collect any coin which may be deposited at the called paystation. Where the connector is used in a connection established from a toll operator's position, the collection of coins may be under the operator's control.

Other features will appear hereinafter.

The drawings consist of thirteen sheets having sixteen figures, as follows:

FIG. 1 is a schematic block diagram showing a conventional arrangement wherein a prepay paystation adapter circuit is inserted between the conventional linefinder and the conventional selector to provide means for controlling the circuits when a call is made from a paystation wherein it is required that a coin be deposited before the calling party may be allowed to dial the selective means provided;

Figure 1:
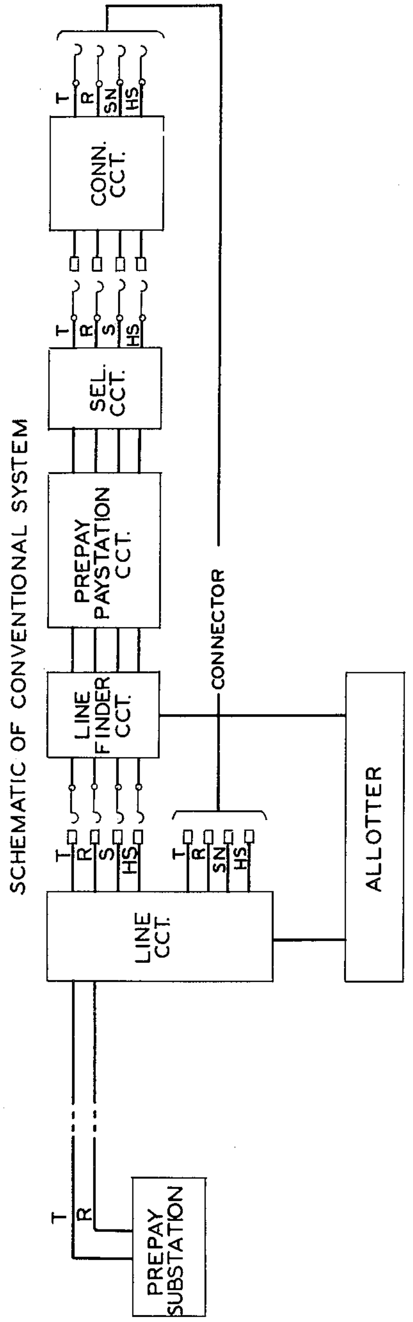
Figure 2:
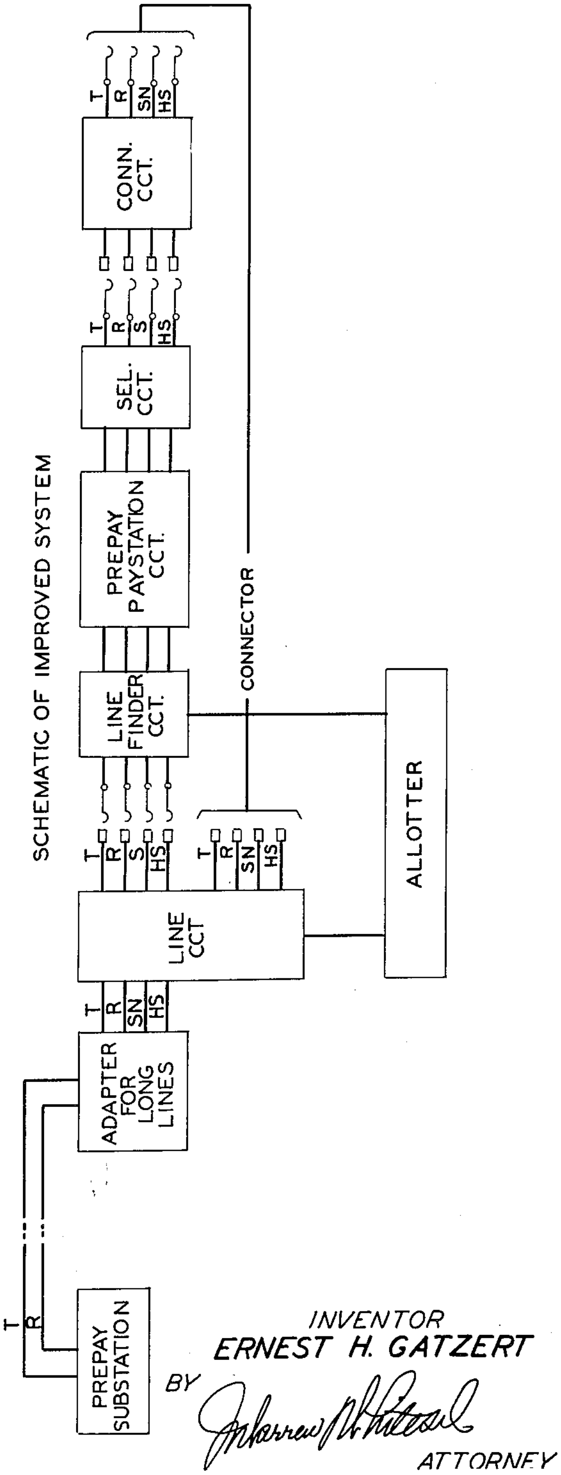
FIG. 2 is a similar circuit having an additional circuit individual to a long line inserted between the long line and its conventional line circuit, having means to modify the operation of the prepay paystation adapter circuit by nullifying certain operations thereof and taking over the functions thereof.
Figure 3:
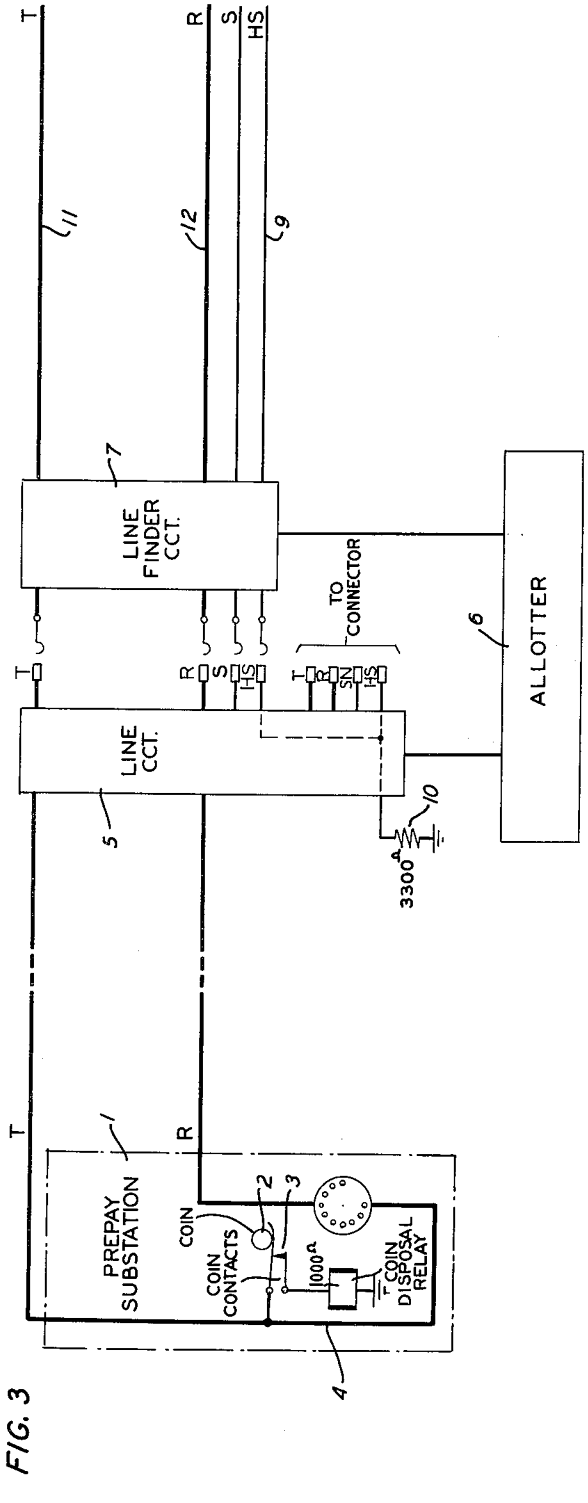
FIG. 3 is a schematic circuit diagram showing a prepay paystation circuit, its line circuit and the line-finder circuit leading into the prepay paystation adapter circuit.
Figure 15:
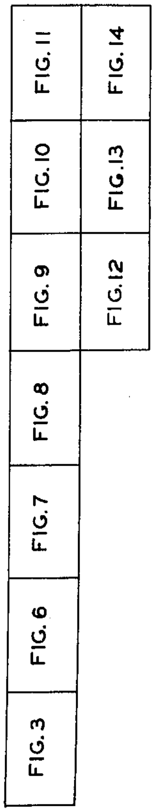
Figures 4, 16:
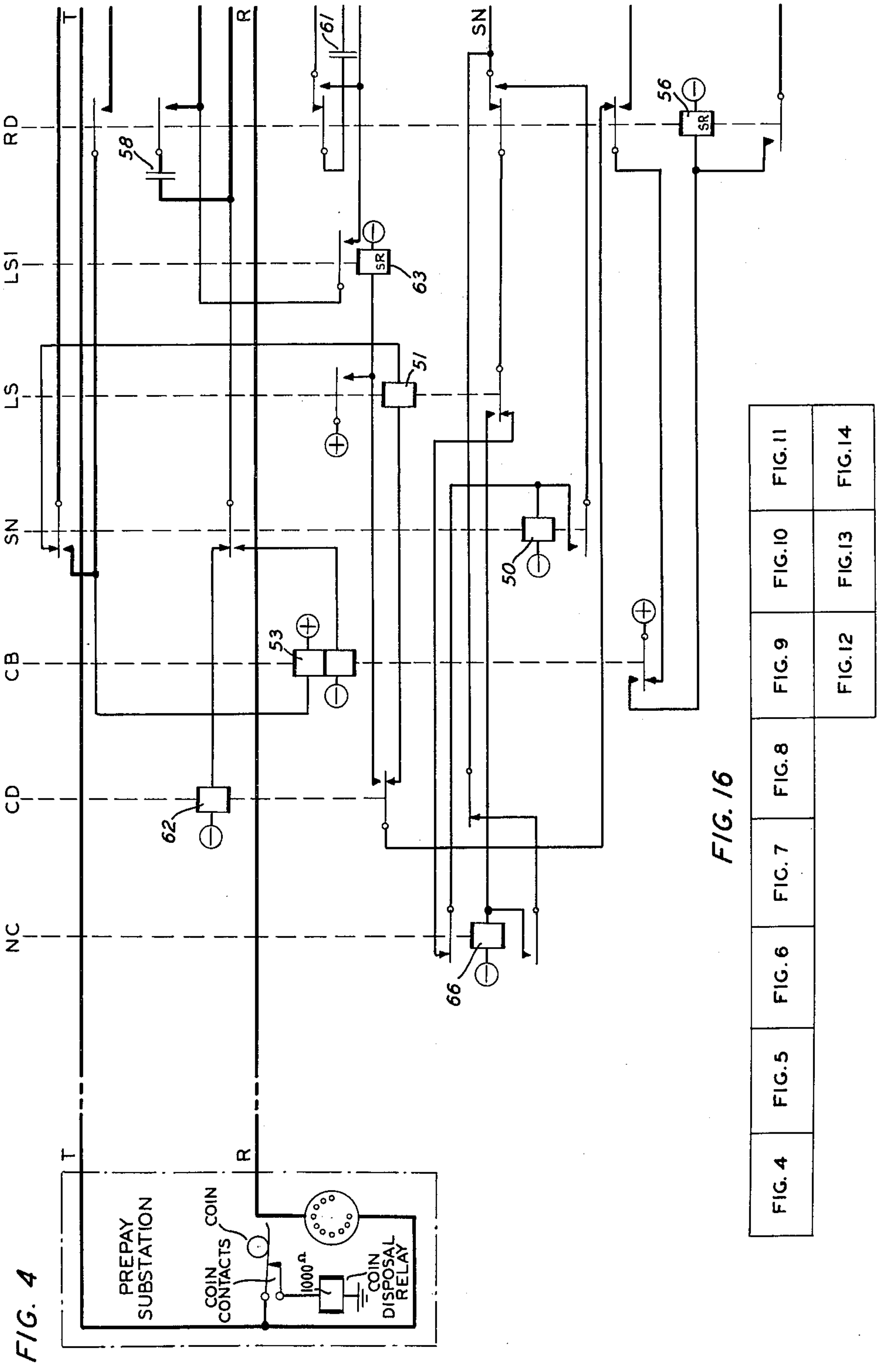
Figure 5:
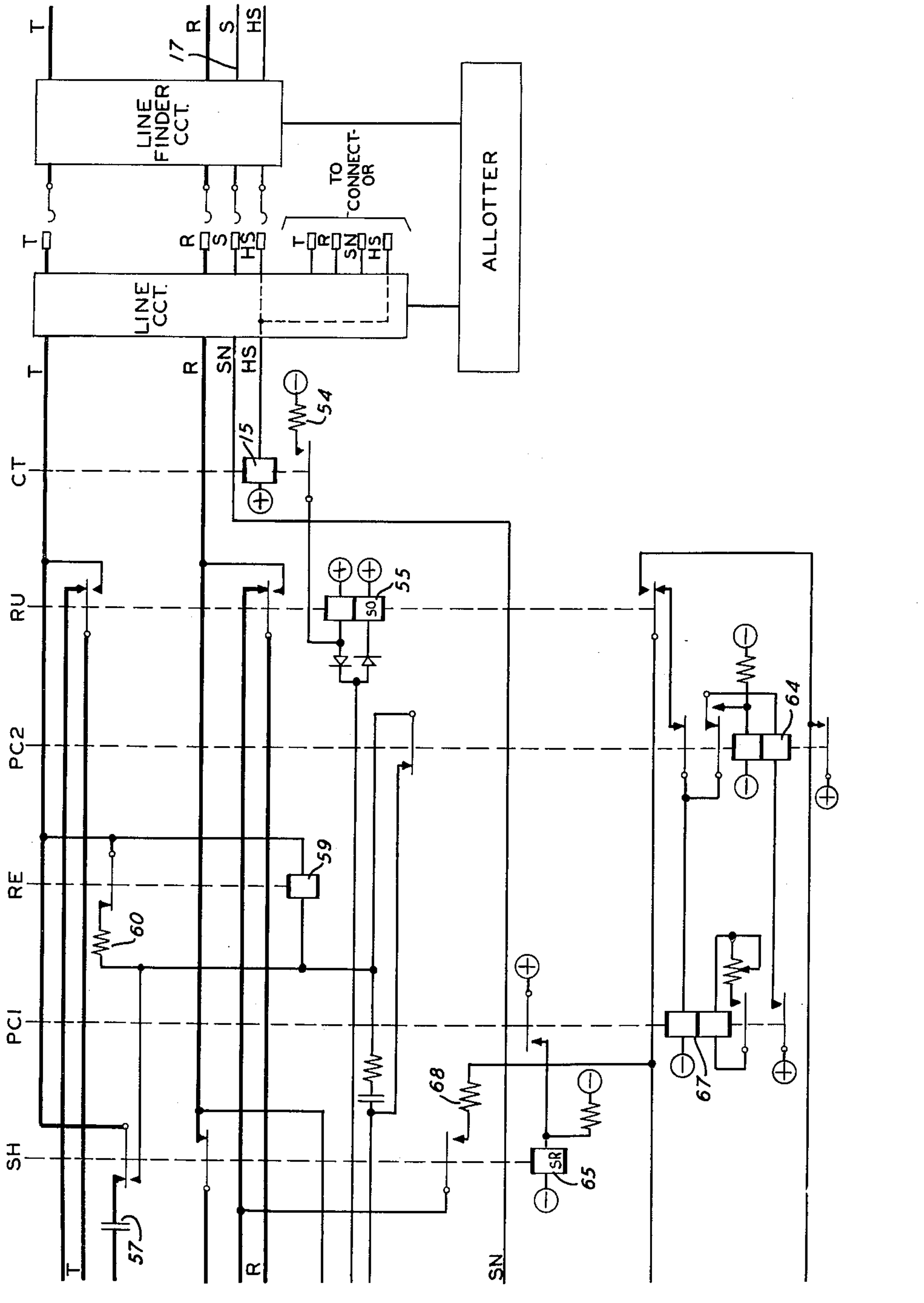
Figure 6:
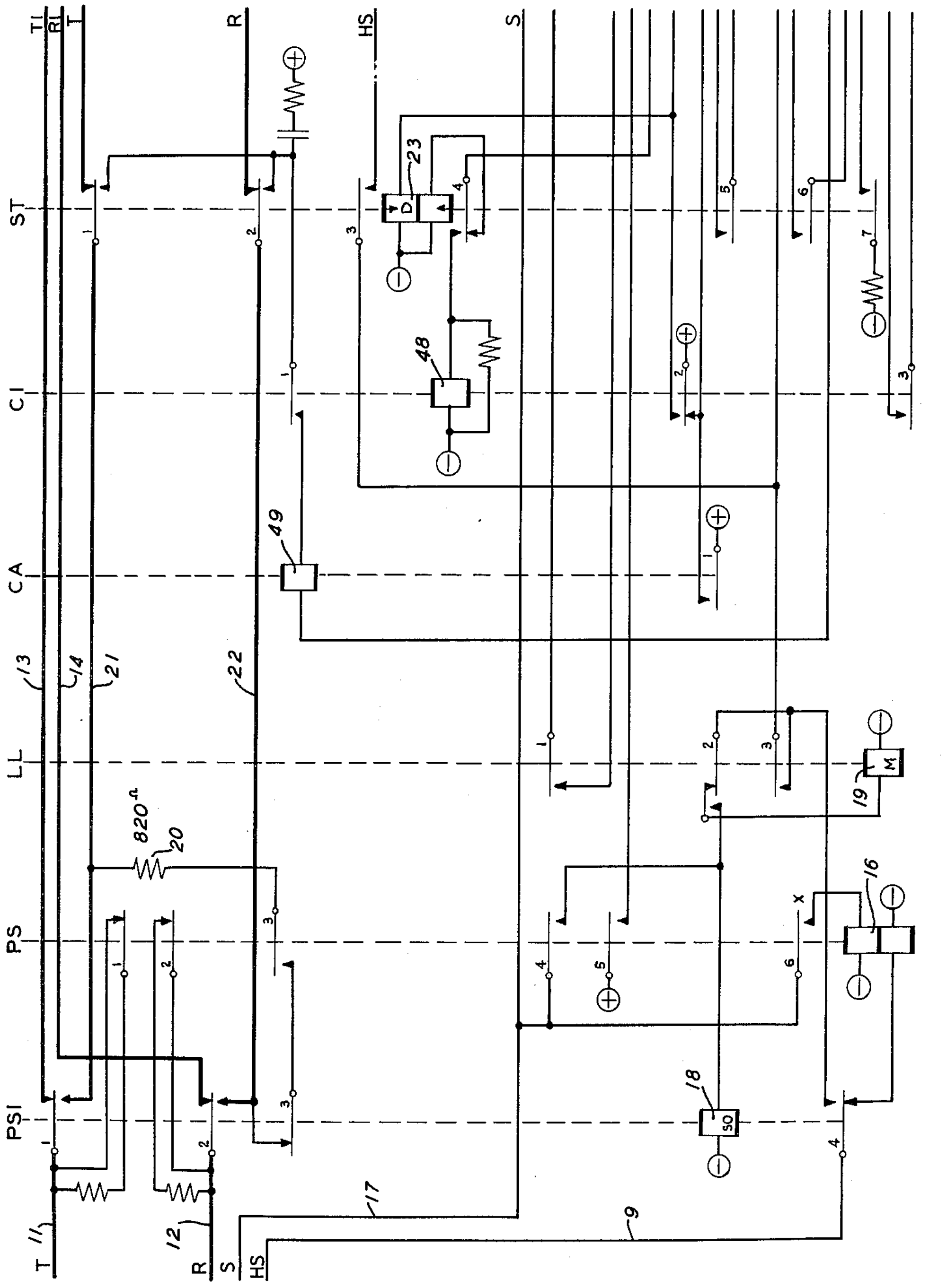
Figure 7:
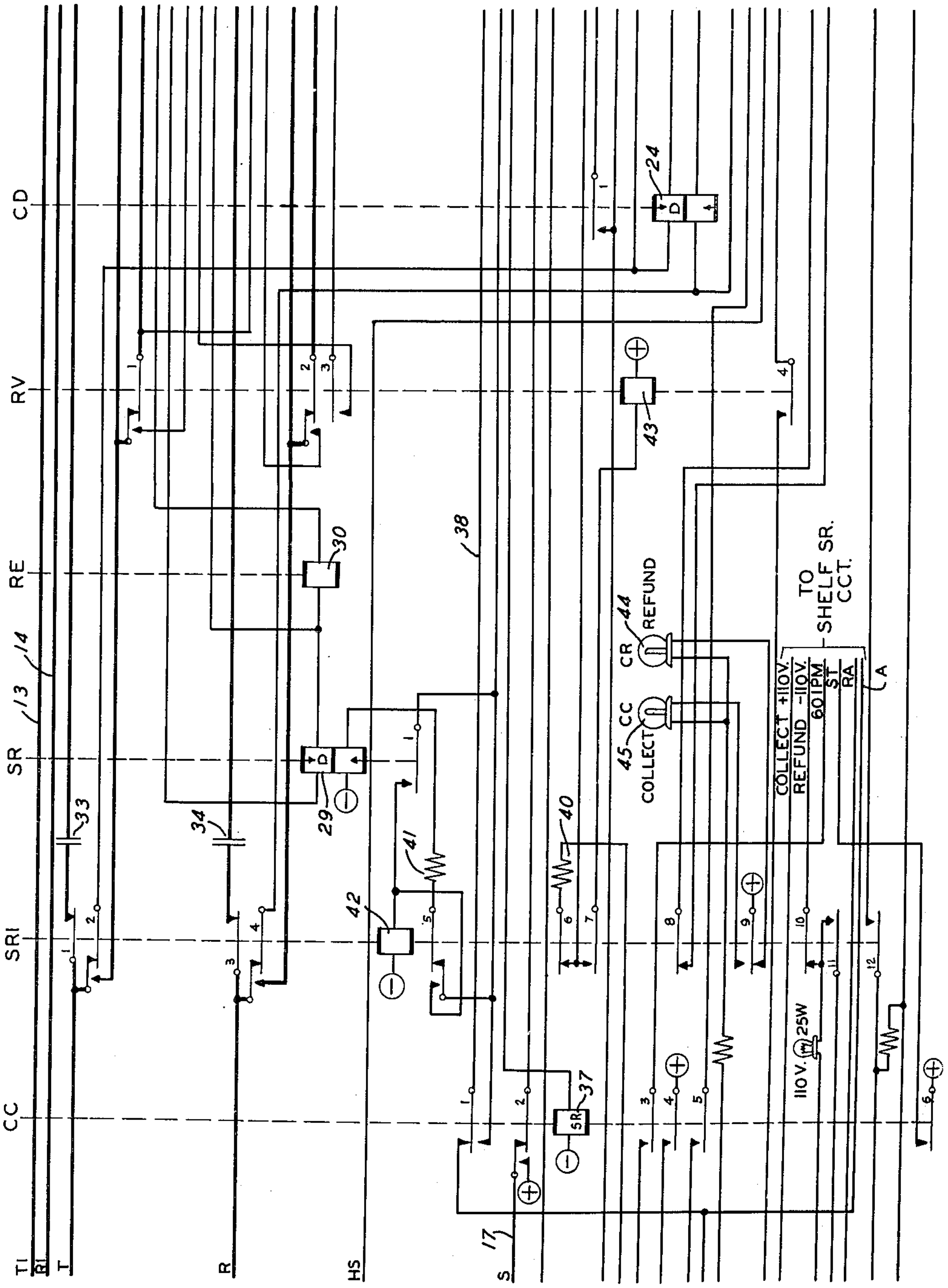
Figure 8:
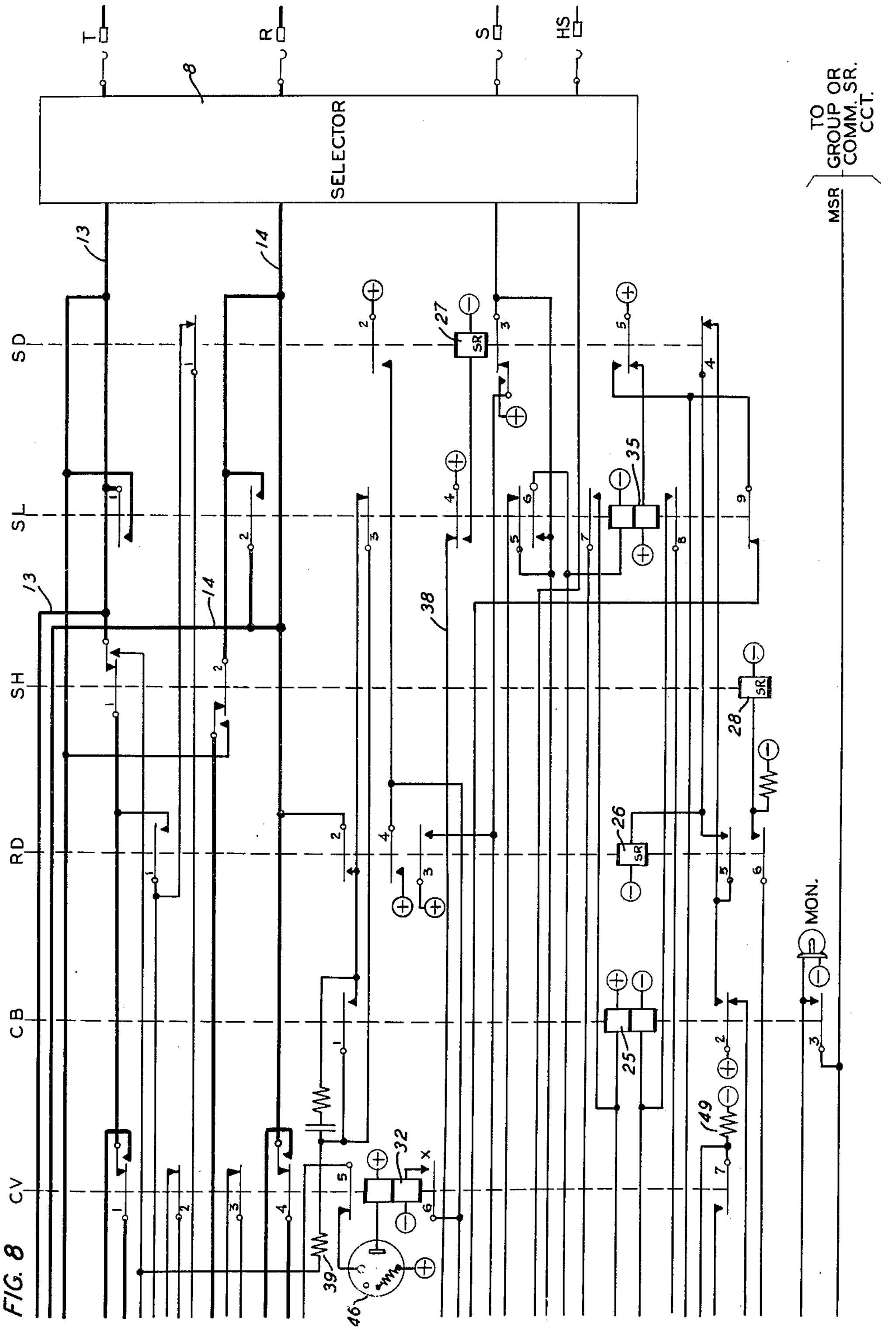
Figure 9:
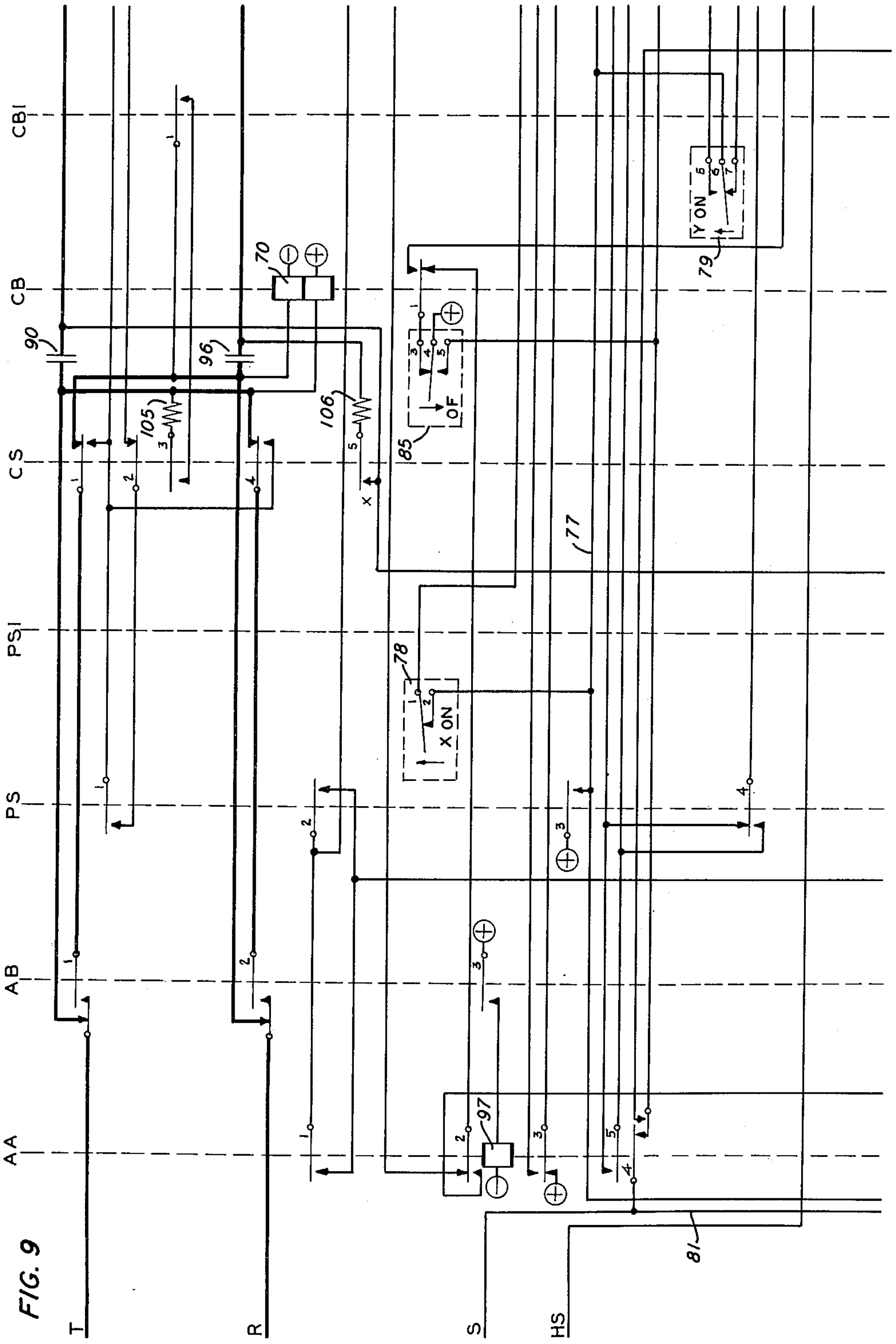
Figure 10:
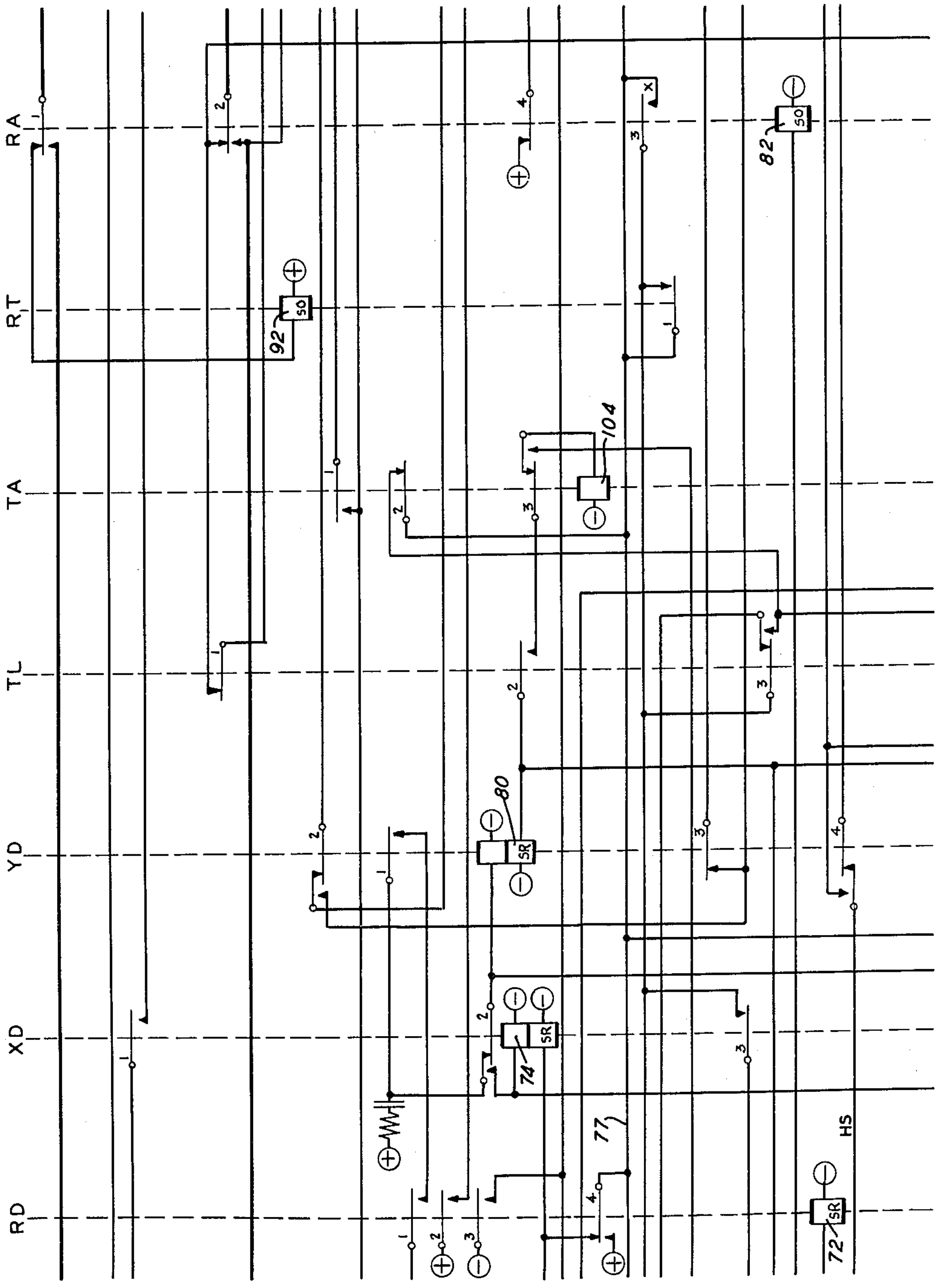
Figure 11:
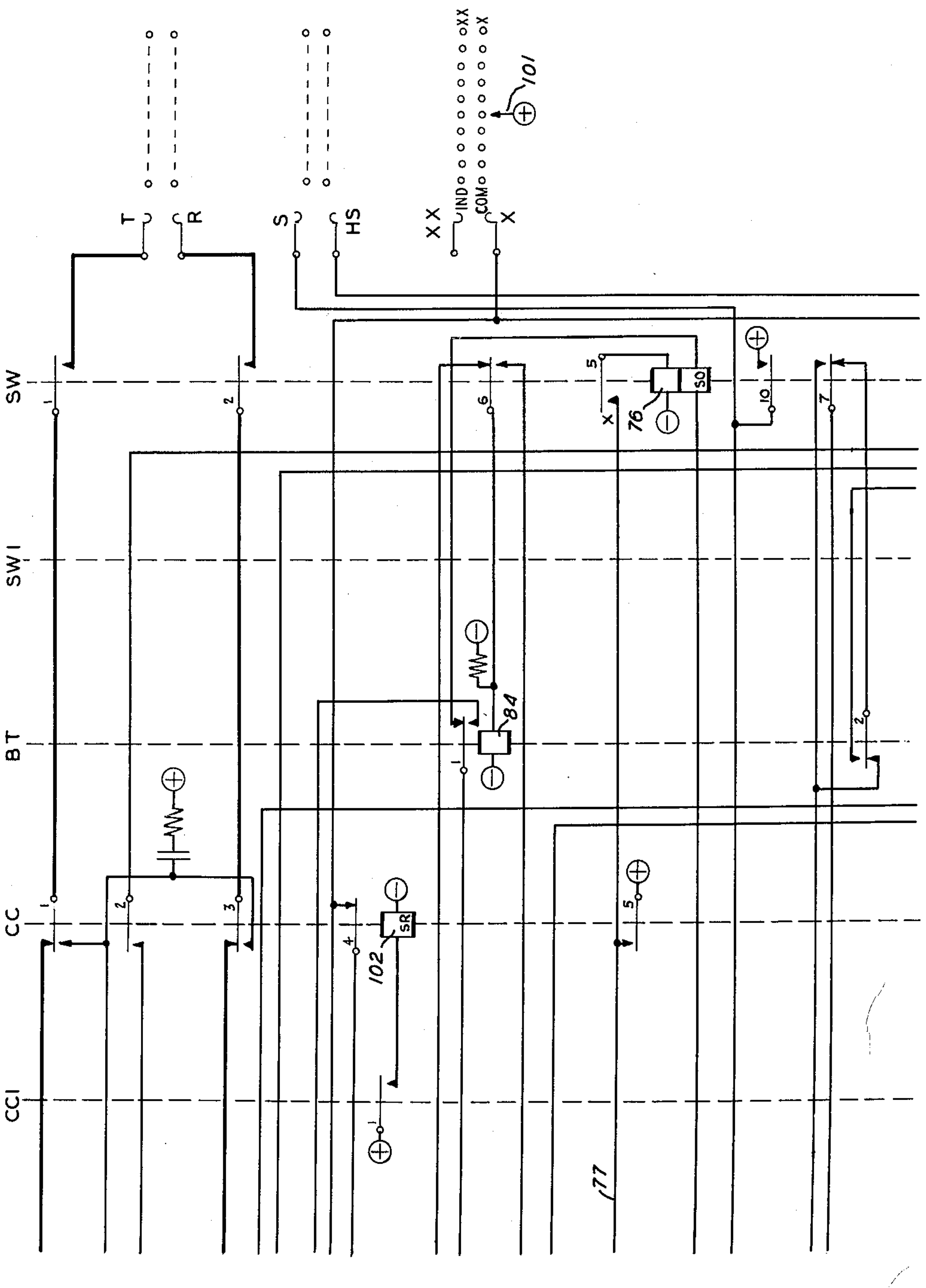
Figure 12:
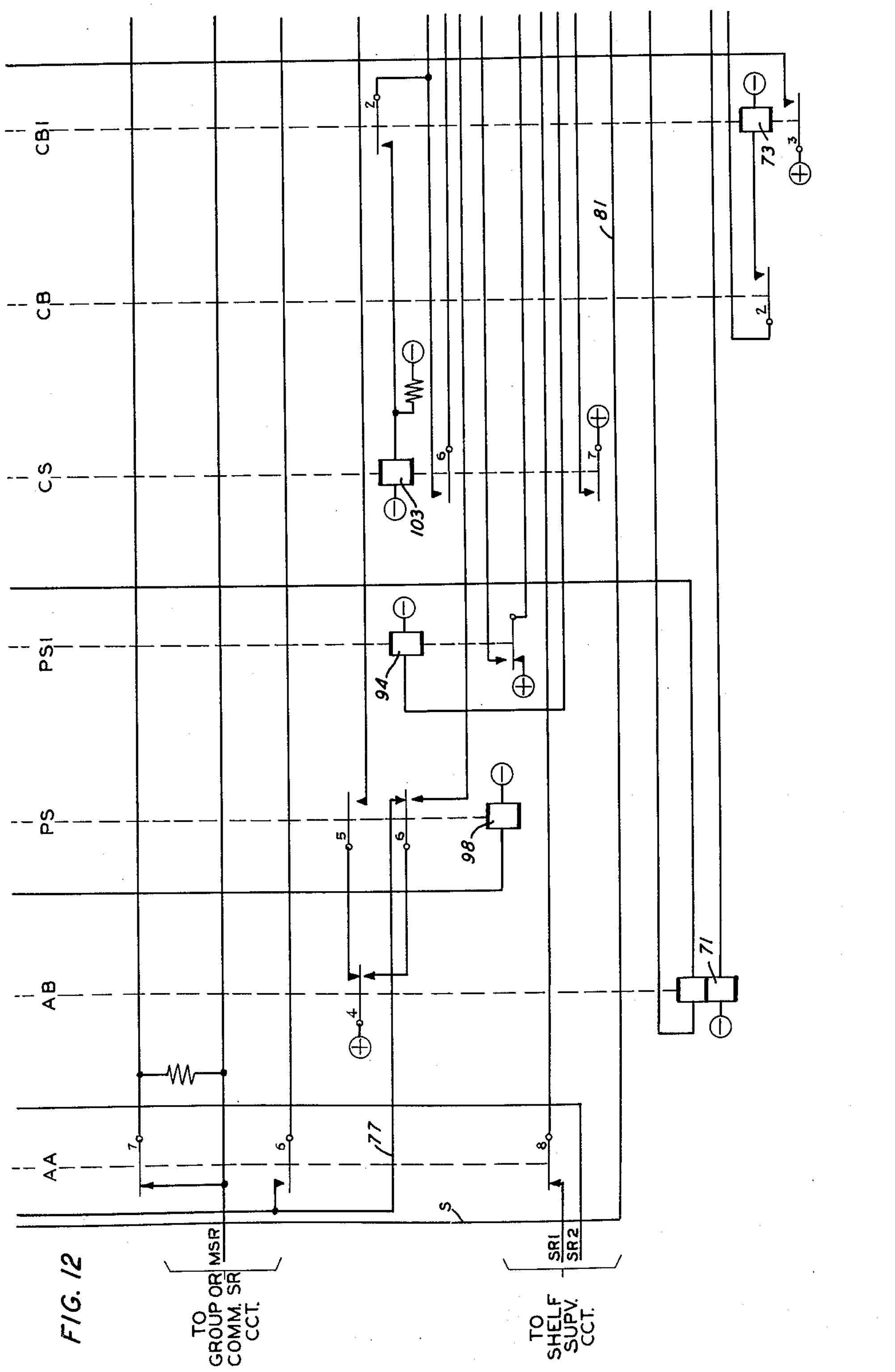
Figure 13:
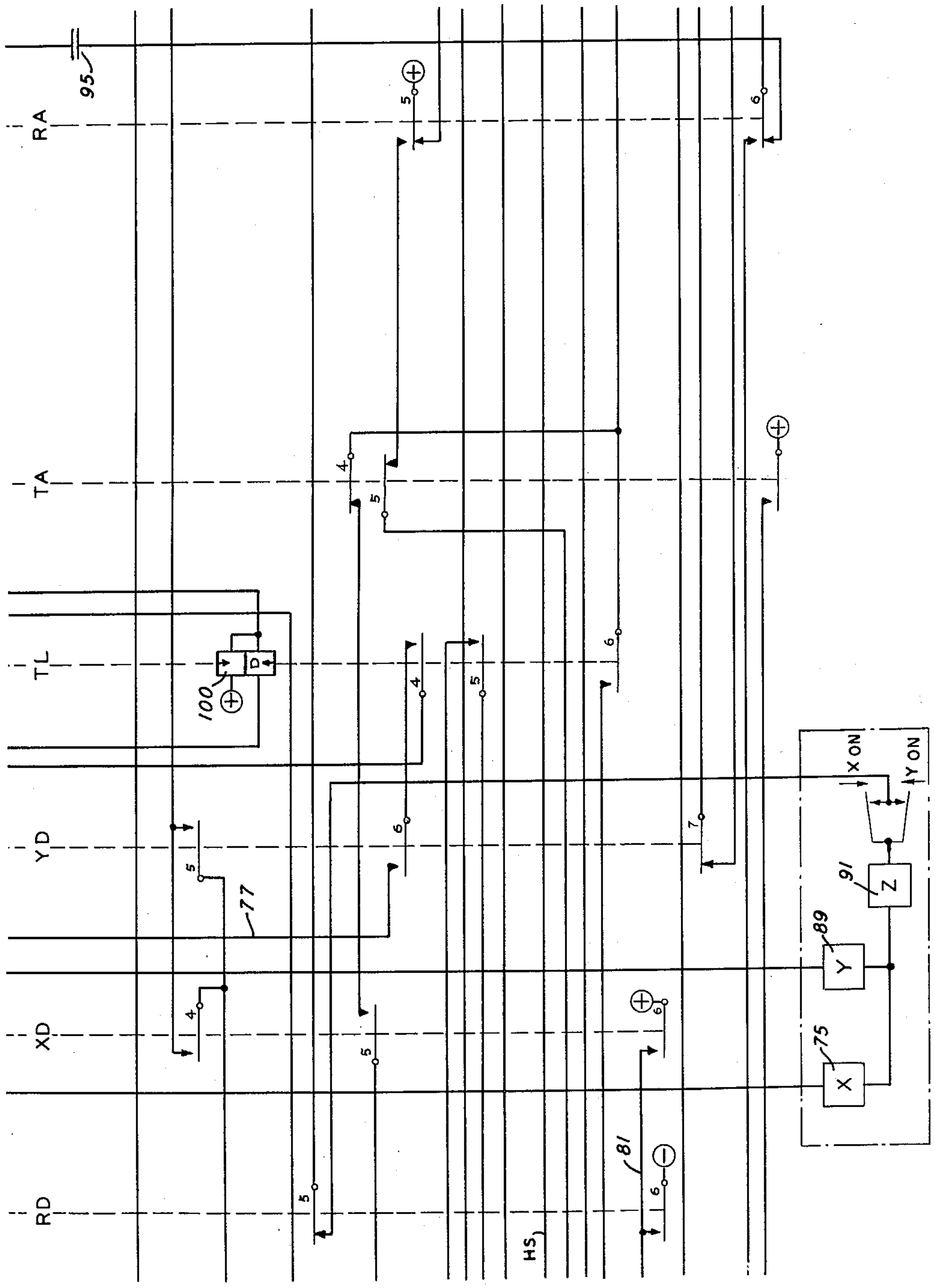
Figure 14:
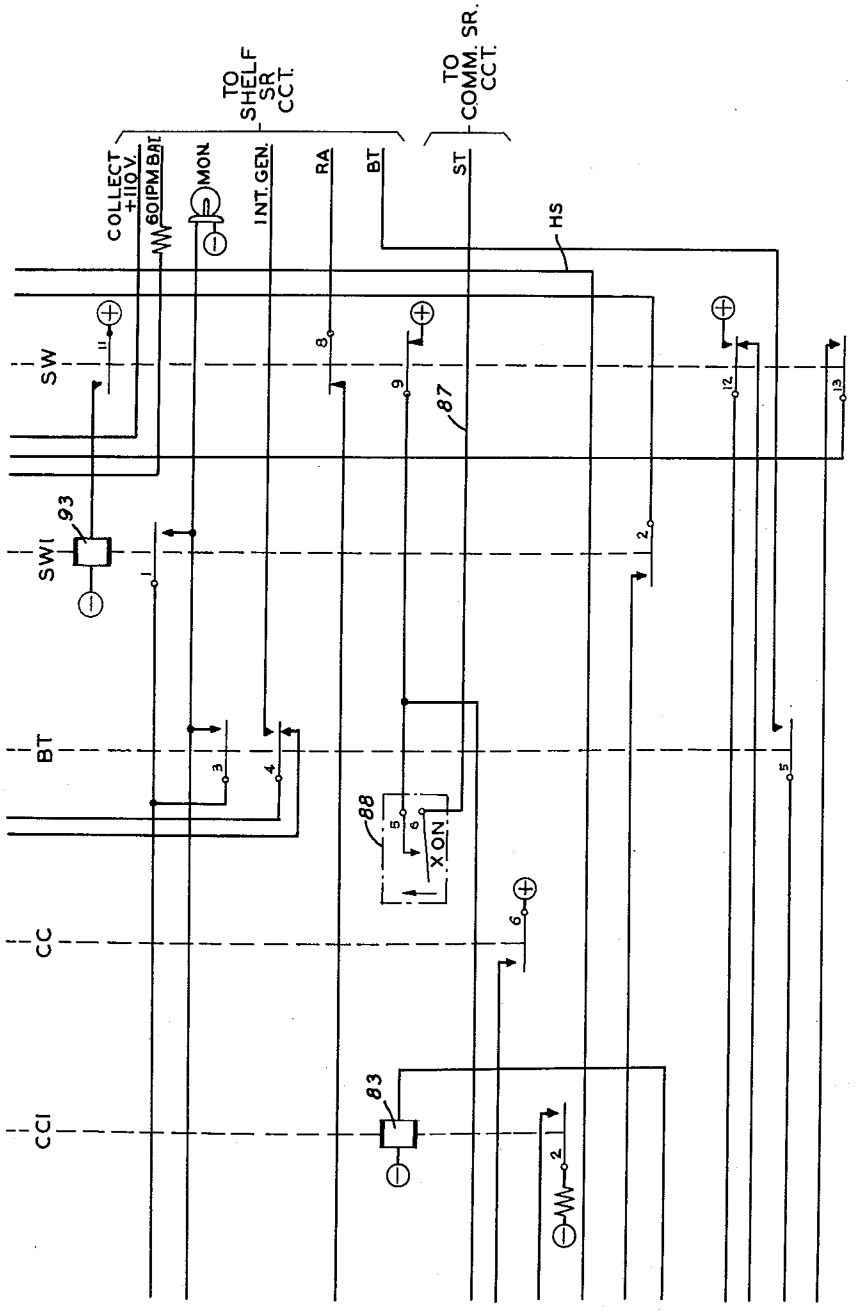

FIG. 4 and FIG. 5 together is a schematic circuit diagram showing a prepay paystation, its individual long line adapter circuit, its individual line circuit and the line-finder circuit leading into the prepay paystation adapter circuit;

FIG. 6, FIG. 7 and FIG. 8 together is a schematic circuit diagram showing a prepay paystation adapter circuit leading from a linefinder circuit into a conventional selector circuit;

FIG. 9 to FIG. 14 inclusive taken together is a schematic circuit diagram of a connector circuit suitable for use in a system adapted to handle traffic from regular or from paystation substations into regular, official or free service stations or into toll operators' circuits;

FIG. 15, on the same sheet with FIG. 3, is a block diagram showing how certain of the above described figures may be arranged to provide a complete schematic circuit diagram of a system such as that of FIG. 1; and FIG. 16, on the same sheet as FIG. 4, is a block diagram showing how certain of the above described figures may be arranged to provide a complete schematic circuit diagram of a system such as that of FIG. 2.

In the drawings, FIG. 1 is a schematic layout showing a conventional system in which a prepay paystation circuit is employed between the linefinder circuit and the selector circuit and which acts to detect the presence of a coin at the calling substation by seeking a resistance ground to the line conductors. The coin may be deposited by the application of +100 volts to the line conductors and returned by the application of −100 volts thereto.

The system pictured by FIG. 1 is shown in detail in the circuits contained in the ten figures arranged as indicated in FIG. 15 (on the same sheet as FIG. 3).

In this arrangement, which will be described in detail for the purpose of making the novel features of the present invention clear, a prepay substation 1 is shown in the condition which would be established under a calling condition. It is to be noted that a coin 2 has been paid into the device and is resting in such a position that the coin contacts 3 are closed, thus estalishing a 1000 ohm connection between the tip and ring conductors and ground through the winding of the coin disposal relay 4.

Under such a calling condition, the line circuit 5 will respond in conventional manner, and by means of the allotter 6 a specific and allotted linefinder 7 will act to pick up the calling line and extend the calling line conductors T, R, S and HS to the selector, or as shown herein, through the prepay paystation circuit of FIGS. 6, 7 and 8 to the selector 8 indicated in FIG. 8.

Thereafter, the connection is dialed by the calling subscriber through the conventional switch train and through the conventional connector shown in detail in FIGS. 9–14, which will be described since it controls the means for disposing of the coin 2 both in the conventional arrangement indicated in FIG. 1 and the improvement indicated in FIG. 2.

The circuits of FIGS. 6, 7 and 8 comprise a prepay paystation adapter circuit whose principal function in connection with the present invention is to discriminate between regular lines which are characterized by the absence of ground on the linefinder HS lead 9, prepay lines which are characterized by the presence of a high resistance ground connection on the linefinder HS lead 9 and prepay lines with the long line adapter (FIGS. 4 and 5) which are characterized by the presence of a low resistance ground on the linefinder HS lead 9. The dead ending of the HS lead 9 in the line circuit is conventional and the making of various connections thereto for various purposes is also conventional. In FIG. 3 such a connection of a high resistance ground connection through a resistor 10 is indicated and it is clear in FIGS. 4 and 5 how a low resistance connection to the HS lead is provided to signal the presence of a long line adapter.

The prepay paystation adapter circuit is also arranged to send a cut through signal to the long line adapter for cut through on application of coin collect or coin return voltage. The circuit provides automatic coin refund on release from unanswered call or on free calls when reverse battery answer supervision is not given. It provides automatic coin collect on release on answered calls when reverse battery answer supervision is given. Other conventional provisions are made.

When a call is made by a regular line the seizure is conventional and since there is no ground present on the HS lead 9 no operation of the circuits of FIGS. 6, 7 and 8 are caused and the talking circuit tip and ring conductors 11 and 12 respectively are extended through to conductors 13 and 14 respectively to the selector 8, whereby conventional operation is obtained.

*Seizure from paystation line via long line adapter*

When the arrangement of FIG. 16 is used instead of the arrangement of FIG. 15, that is, when the paystation is on a long line and the resistance of its loop is high, then the circuits of FIGS. 4 and 5 are used in place of the simple circuit of FIG. 3. In this case when the linefinder switches through to this circuit (as will be more fully described hereinafter) and a low resistance ground, the winding of the CT relay 15, then a low resistance path is established to the lower winding of the PS relay 16 which is operated thereby. The PS relay 16 operates and locks through its upper winding to the ground temporarily forwarded from the line circuit over the sleeve lead 17. The PS relay 16 causes the operation of the PS–1 relay 18 and this extends the low resistance ground now on the HS lead to an operating circuit for the LL marginal relay 19 which thereupon locks itself to the sleeve ground on conductor 17.

The operation of the PS relay and the resulting operation of the PS–1 relay 18 extends the T and R leads 11 and 12 to the tip and ring leads 21 and 22 respectively and bridges the 820 ohms resistor 20 across the circuit. The leads 21 and 22 connect through the back contacts of the ST relay 23 through the windings of the CD relay 24 and the CB relay 25. Relay 25 operates and closes an operating circuit for the release delay RD relay 26.

This first slow relay RD operates and connects ground to the linefinder and selector sleeve leads to replace that temporarily placed on the S lead 17. Relay 26 closes an alternate holding circuit for itself independent of the armature 4 of the SD relay 27, prepares a circuit for the SH relay 28 and connects the tip and ring leads 13 and 14 from the selector to a bridge circuit including the upper winding of the SR relay 29 and the RE coil 30 for the purpose of seizing succeeding equipment. The selector 8 is thus seized and the current derived therefrom flows through the upper winding of the SR relay 29. This does not energize the relay, however, as a circuit has been closed from the armature 4 of the RD relay 26 to energize the lower winding of the SR relay 29 and since the two windings thereof are differentially wound, the SR relay does not respond at this time. The RD relay 26 also prepares a holding circuit for the CV relay 32.

The CD relay 24 is also differentially wound and does not respond at this time. It will be noted later that the deposit of a coin at the calling substation by placing a 1000 ohm connection to ground on the tip conductor will unbalance the currents in the two windings of the CD relay 24 whereby this relay operates to report the deposit of a coin.

The operation of the PS relay 16 is followed by the operation of the PS–1 relay 18, as described. The operation of the PS relay 16 bridges the resistance 820 across the leads from the CB relay 25 and the CD relay 24 and the PS–1 relay 18 as it substitutes the calling party loop then opens this bridge. The PS–1 relay 18 closes a circuit from the low resistance connection to the HS lead 9 to the marginal LL relay 19 and then opens the original operating path for the PS relay 16.

Capacitors 33 and 34 provide a path whereby dial tone from the selector 8 may be transmitted to the calling subscriber.

The LL relay 19 operates and closes a holding circuit to itself from ground present on the sleeve lead 17 and disconnects the HS lead 9 from the winding of the LL relay 19 and extends it to the circuits of FIGS. 7 and 8. Through its armature 1 the LL relay 19 closes a circuit from battery, the upper winding of the SL relay 35, front contact and armature 1 of the LL relay 19, back contact and armature 5 of the SL relay 35, armature 3 and back contact of the SD relay 27, front contact and armature 3 of the RD relay 26 to ground whereby the SL relay 35 moves its X armature and establishes a circuit independent of the armature and contact of the LL relay 19.

The SL relay 35 operates fully and by its armature 9 opens the operating path of the CC relay 37. Through its armatures 7 and 8, the SL relay 35 shunts both windings of the CD relay 24, and by its armature 5 it opens its original operating circuit. Through its armature 4 it closes a circuit for the SD relay 27 at the same time removing ground from the conductor 38. Through its armature 3 the loop from the ring conductor 14 through the resistor 39, the RE coil 30 and the upper winding of the SR relay 29 is placed under control of the armature 1 of the CB relay 25 whereby the calling subscriber may dial into the selector 8.

The SD relay 27 operates, and through its armature 1 opens a shunt from about the upper winding of the SR relay 29, connects an alternate ground to the lower winding of the SR relay 29, connects an alternate ground to the linefinder sleeve lead and transfers the holding circuit for the SL relay 35 to the selector sleeve lead whereby the continued operation of the SL relay depends wholly on the selector 8 and the succeeding circuits.

The circuit is now ready to receive dial pulses from the calling line.

*Seizure from paystation line*

When the linefinder switches through to this circuit (FIGS. 6, 7 and 8), as indicated by the block diagram FIG. 15, whereby the high resistance ground 10 is present on the HS lead 9, a circuit is closed to the lower winding of the PS relay 16 as before and in this case also causes the operation of this PS relay 16.

The PS relay 16 connects its upper winding to the sleeve lead 17 whereby it remains locked until the connection is released. Through its armature 5 and by way of resistance 40, relay 16 establishes a resistance ground connection to the HS lead of the selector 8 and the succeeding equipment to mark the call as a paystation call. Relay PS closes the loop through the resistance 20 and the windings of the CD relay 24 and the CB relay 25. The CB relay 25 responds and causes the operation of the RD relay 26. The CD relay does not operate at this time.

The release delay relay 26 operates and connects ground from its armature 3 to the sleeve lead 17, closing a circuit for the PS–1 relay 18 and the upper winding of the PS relay 16. The RD relay closes an alternate circuit for itself, prepares a circuit to the SH relay 28, connects the T and R leads 13 and 14 from the selector 31, through the RE coil 30 and the upper winding of the SR relay 29, thus closing a loop to seize the succeeding equipment. The RD relay 26 closes an energizing circuit through the resistance 41 for the lower winding of the relay SR relay 29 but this relay, being differentially wound, does not operate at this time. The RD relay 26 also prepares a holding circuit for the CV relay 32.

The PS–1 relay 18 operates, connects the T and R loop of the calling line through to conductors 21 and 22 to the windings of the CD relay 24 and the CB relay 25 and opens the resistance loop to the resistor 20. The PS–1 relay 18 disconnects the linefinder HS lead 9 from the lower winding of the PS relay 16 and transfers this HS lead 9 to the winding of the LL relay 19. However, due to the high resistance 10, the LL relay 19 will not respond at this time.

*Coin deposit*

When the calling party deposits a coin, the coin contacts (FIG. 3) are closed and a 1000 ohm connection through the winding of the coin disposal relay 4 to ground is made to the tip conductor, thus unbalancing the line through the windings of the CD relay 24 and allowing this relay to operate. The operation of the CD relay 24 closes a circuit for the upper winding of the SL relay 35 and this relay first operates its X armature and thus establishes a holding circuit for itself. The SL relay 35 operates fully, opens the operate path to the CC relay 37, shunts both windings of the CD relay 24 thus releasing the CD relay and opening its original operating circuit. The SL relay 35 closes a circuit to the SD relay 27, removes ground from lead 38 and places the T and R loop to the succeeding equipment under control of the CB relay 25.

The CD relay 24 restores. The SD relay 27 operates, removes the shunt from the upper winding of the SR relay 29, connects an alternate energizing ground to the lower winding thereof and connects an alternate ground to the linefinder sleeve lead 17. The SD relay 27 transfers the SL relay 35 to a holding ground from the seized selector sleeve ground, thus making the SL relay wholly dependent on the selector and the succeeding equipment. The circuit is now ready to receive dial pulses from the calling line.

*Dialing*

When the calling party dials, the loop to the CB relay 25 is interrupted in accordance with the digit dialed. The CB relay follows the dial pulses and upon restoring each time opens the loop to the succeeding equipment, opens the circuit to the RD relay and closes a circuit to the SH relay 28, which responds to the pulses as a train. The SH relay disconnects the RE coil 30 and the winding of the SR relay 29 from across the T and R leads to prevent impulse distortion during dialing.

The CB relay 25, on reoperating after each pulse, recloses a circuit to the RD relay 26 and opens the circuit to the SH relay 28 but both these relays, being slow to release, maintain their operated condition, the latter restoring in time after the completion of the train. When the SH relay 28 restores, it reconnects the RE coil 30 and the upper winding of the SR relay 29 across the selector tip and ring leads.

The SR relay 29 will not operate at this time due to the direction of current flow through its upper winding which is arranged to oppose that through its lower winding and which condition is maintained until the called party answers.

*The called party answers*

When the called party answers, a succeeding circuit applies resistance battery to the HS lead and reverses the T and R leads causing the current flow through the upper winding of the SR relay 29 to aid the current flow through the lower winding thereof thus allowing the SR relay to operate. The SR–1 relay 42 is now operated over armature 1 of the SR relay, and the SR–1 relay closes a locking circuit directly to armature 4 of the RD relay 26. The SR–1 relay 42 opens the circuit for the lower winding of the SR relay 29, and closes a circuit from the RV relay 43 to the HS lead through the selector 8 and which, having resistance battery thereon as long as the called party holds the connection, maintains the RV relay 43 in operated condition. The SR–1 relay, at its armature 8, opens the operating path to the SH relay 28, transfers ground from the coin refund lamp 44 to the coin collect lamp 45, prepares the circuit for applying +110 volts coin collect voltage, removes the coupling capacitors 33 and 34 from the line, connects the selector tip and ring leads through to the linefinder on a metallic basis and opens the tip and ring loop to the CB relay 25.

The RV relay 43 operates, prepares the circuit for applying resistance battery to the linefinder HS lead, connects the 426–A cold cathode gas tube 46 to the selector ring lead and reverses the selector T and R leads thus simulating the normal battery to the linefinder T and R leads.

The CB relay 25 restores, thus releasing the RD relay 26. The release of the CB relay opens the T and R loop through the RE coil and the upper winding of the SR relay 29, whereby the SR–1 relay is now left dependent on its own locking circuit to the ground supplied by armature 2 of the SD relay 29. The release of the RD relay removes an alternate ground from the linefinder sleeve lead and also removes an alternate holding ground from the SR–1 relay. Conversation may now take place over the T and R leads.

*Release after call to regular line*

When the calling party disconnects, the tip and ring loop is opened, causing the succeeding equipment to restore, which removes resistance battery from the selector HS lead, opening the circuit to the RV relay 43 and removes ground from the selector S lead thus opening the holding circuit to the SL relay 35. The RV relay 43 and the SL relay 35 restore. The SL relay 35 opens the circuit to the SD relay 27, prepares an alternate holding circuit for the SR–1 relay 42 from armature 2 of the SD relay 27, removes the shunt from both windings of the CD relay 24 and closes a circuit from armature 5 of the SD relay 27 to the CC relay 37. The SD relay 27, due to its slow releasing characteristics, remains operated a few milliseconds, thus maintaining SR–1 relay 42 and causing the operation of the CC relay 37.

The CC relay in operating, closes an alternate holding circuit for the SR–1 relay 42 over conductor 38 from ground on armature 4 of the S1 relay 35, and connects ground to the linefinder S lead 17, at the same time removing the ground supplied by the alternate contacts of armature 3 of the SD relay 27. Relay 37 connects direct ground by its armature 4 to the upper winding of the ST relay 23 and through its armature 3, the 60 IPM lead to the lower winding of the ST relay. Relay 37 also closes a holding circuit for itself through back contact and armature 9 of the SL relay 35, armature 5 and front contact of CC relay 37 and back contact and armature 2 of the C1 relay 48. Through its armature 6, the CC relay 37 applies ground to the ST lead for the usual purposes.

The SD relay 27 restores, removes alternate holding ground from the SR–1 relay 42 but this latter relay remains operated over conductor 38. The SD relay 27 opens the original operating path to the CC relay but this relay also remains operated over its holding circuit under control of the C1 relay 48. Through its armature 5 the SD relay 27 shunts the lower winding of the SL relay 35.

The ST relay 23 is a differential relay and will operate when there is no ground on the 60 IPM lead. If ground is present on the 60 IPM lead at the time, the CC relay 37 operates, the ST relay 23 will not operate until that ground disappears, whereby the sending of a too short pulse of coin voltage to the paystation is avoided.

The ST relay 23 on operating, connects the T and R leads to the paystation together through its armatures 1 and 2 and transfers the 60 IPM lead from its lower winding to the winding of the C1 relay 48. Through its armature 3 the ST relay 23 connects battery and resistance 49 to the linefinder HS lead in the event that the LL relay 19 has been operated to cause the long line adapter circuit (FIGS. 4 and 5) to connect the paystation through to the T and R leads of this circuit directly on a metallic line thus preparing the circuit for applying coin voltage via the long line adapter circuit. The ST relay 23 connects the coin control lamps 44 and 45 through its armature 5 to the A lead, extends coin voltage to control of contacts on armature 1 of the C1 relay 48, and applies resistance battery through its armature 7 to the RA lead to start a timing device to give an alarm if this circuit fails to dispose of the coin within a predetermined interval of time. The C1 relay 48 operates when a 60 IPM ground pulse appears and closes an alternate holding circuit from its armature 2 for the ST relay 23. Relay 48 opens the holding circuit for the CC relay 37 and applies +110 volt coin collect voltage through the winding of the CA relay 49 onto the paystation line. The CC relay 37 remains operated due to its slow releasing characteristic. However, the CA relay 49 responds to the coin collect current and closes an alternate holding circuit for this CC relay. The C1 relay 48 restores when the 60 IPM ground pulse terminates and disconnects coin collect voltage from the joined tip and ring circuit, thus opening the circuit for the CA relay 49. The CA relay 49 restores and now opens the alternate holding circuit for the CC relay 37 but this relay, due to its slow releasing characteristic, remains operated until it is certain that the coin has been collected. Until such time, the C1 relay 48 will regularly respond to the 60 IPM pulses and the CA relay 49 will respond to the coin collect current. When the coin has been collected and the coin contact has opened, the CA relay 49 will fail to operate with the consequence that the CC relay 37 will restore during the time the C1 relay 48 is operated.

The CC relay 37 upon restoring, opens the holding circuit for the SR–1 relay 42, thus allowing this relay to restore. The CC relay 37 opens the 60 IPM lead to the C1 relay 48 and removes the alternate holding ground for the upper winding of the ST relay 23. Relay CC opens its own holding path, removes ground from the ST lead, removes ground from the linefinder S lead thus releasing the preceding equipment and opening the holding circuits for the PS relay 16, the PS–1 relay 18 and for the LL relay 19, if this relay had been operated.

The ST relay 23 restores and removes resistance battery from the RA lead. The PS relay 16 restores before the restoration of the PS–1 relay thus preventing the establishment of the 820 ohm bridge through resistor 20 from being reconnected across the T and R leads. The circuit is restored to normal and now becomes available for other calls.

Where the long line adapter having its relay 15 connected to the HS lead is not used, then it is not necessary to place resistance battery on the HS lead 9 and hence the LL relay 19 only operates when the call comes through such a circuit as that shown in FIGS. 4 and 5.

*Operator answers*

When the call has been directed to the operator and she answers, resistance battery is applied to the selector HS lead and reverse battery is applied to the selector T and R leads causing the current flow through the upper winding of the SR relay 29 to aid the current flow through the lower winding thereof thus allowing the SR relay to operate. The operation of the SR relay 29 causes the operation of the SR–1 relay 42 which thereupon closes a locking circuit for itself independent of the SR relay. The SR–1 relay 42 opens the circuit to the lower winding of the SR relay, closes a circuit to the RV relay 43 from resistance battery present on the selector HS lead, opens the operating path to the SH relay 28, transfers ground to the coin collect lamp 45, prepares the circuit for applying +110 volt coin collect voltage, prepares a resistance path to the MON lamp, removes the coupling capacitors 33 and 34 from the line, connects the selector T and R leads through to the linefinder on a metallic basis and opens the T and R loop to the calling bridge CB relay 25.

The RV relay 43 operates, prepares the circuit for applying resistance battery to the linefinder HS lead, connects the 426–A cold cathode gas tube 46 to the selector ring lead 14, and reverses the selector T and R leads, thus simulating normal battery to the linefinder T and R leads.

The CB relay 25 restores, opens the circuit to the RD relay 26, opens the T and R loop through the RE coil 30 and the upper winding of the SR relay 29, thus opening the circuit of this latter relay, and transfers the MON lamp to a resistance circuit to provide a dim lamp during conversation.

The SR relay 29 restores and transfers the SR–1 relay 42 to its holding circuit.

The RD relay 26 restores, removes alternate ground from the linefinder S lead and removes an alternate holding ground from the SR–1 relay 42 leaving this latter relay dependent on the ground on armature 2 of the SD relay 27.

Reverse battery is now removed from the selector T and R leads and negative coin return voltage is applied to the T and R leads automatically by the succeeding trunk circuit associated with the called operator thus causing the deposited coin to be refunded when the paystation is connected directly to the linefinder T and R leads. Negative coin voltage present on the selector ring lead causes the 426–A cold cathode gas tube to conduct and close a circuit to the upper winding of the CV relay 32. This latter relay operates its X preliminary make contacts thus closing a holding circuit to itself from ground on armature 2 of the SD relay 27.

The CV relay 32 operates fully, contacts the selector T and R leads directly through to the linefinder T and R leads independent of the contacts of the RV relay 43 and removes the negative coin voltage from the 426–A cold cathode gas tube 46. The CV relay 32 applies resistance battery through the resistance 49 to the linefinder HS lead 9 providing the LL relay 19 is operated, whereby in such event the CT relay 15 of the long line adapter circuit will be operated to extend the line directly to the operator's circuit for the application of coin return battery therefrom.

Resistance battery and negative coin refund voltage are now automatically removed from the selector HS lead and the selector T and R leads respectively by the trunk circuit associated with the called operator and the selector T and R leads are returned to normal battery.

The RV relay 43, operated from resistance battery over the selector HS lead now releases and in turn removes the resistance battery from the linefinder HS lead to release the CT relay 15 where the LL relay 19 has been operated thus re-establishing the transmission bridge in the long line adapter circuit.

Conversation now takes place over the T and R leads between the calling party and the operator, who may thereafter further extend the call.

*Release after call to operator*

When the calling party and the called operator disconnect, the succeeding equipment restores, removing ground from the selector S lead thus opening the holding circuit to the SL relay 35.

This relay restores and the circuit continues to function as hereinbefore described excepting that no circuit will be established to the CA relay 49 when the C–1 relay 48 operates because coin control is controlled by the operator in this case and the CC relay 37 will restore upon the first operation of the C1 relay 48. Also when the SD relay 27 restores, the holding circuit for the CV relay 32 is opened and this relay restores.

*Coin refund*

The following operations take place when the calling party abandons a call after depositing a coin, if the called party does not answer, if the called line is busy, if the call is a free service call marked by absence of resistance battery on the selector HS lead, or if the call is intercepted. If the call is a free service call or is intercepted, battery is not reversed when the call is answered by the called party or by an intercept operator.

After the coin has been deposited and the call has not yet been answered, the PS relay 16 is operated from ground on the HS lead 9, either through the low resistance of the relay 10 where the long line adapter circuit is used or through the high resistance 10 where the calling line leads directly into the linefinder circuit through the conventional line circuit 5. It may be noted that in the case where the long line adapter of FIGS. 4 and 5 is not included in the connection, the SL relay 35 cannot be operated until a coin has been deposited to cause the operation of the CD relay 24. Since the SL relay 35 shunts the dialing contacts of the CB relay 25, the operation of the selector 8 is blocked until a coin has been deposited. Where the long line adapter circuit is used this blocking function is transferred from the prepay paystation adapter circuit (FIGS. 6, 7 and 8) to the long line adapter circuit (FIGS. 4 and 5). Since the LL relay 19 is operated in this case, the armature 1 thereof performs the same function as the contacts of the CD relay 24 whereby the SL relay 35 is operated immediately and regardless of whether or not a coin has been deposited. However, in this case, means is provided in the long line adapter circuit to block the transmission of dial pulses and thus it will be seen that to operate the selector 8 it is necessary in either case to deposit a coin.

The CB relay 25 is operated over the closed loop, the CD relay 24 is operated by the deposit of a coin, and the SL relay 35 is operated by the CD relay if the LL relay has not been operated and the SL relay 35 is locked to sleeve ground from the succeeding equipment. The SD relay 27 is operated by ground on armature 4 of the SL relay.

When the calling party disconnects, the loop to CB relay 25 is opened, and this relay restores, opening the loop to the succeeding equipment. The release of the calling bridge relay restores the first slow relay 26 and momentarily operates the second slow SH relay 28 but this has no effect at this time. The RD relay 26 restores and removes the alternate ground from the linefinder S lead.

When the succeeding equipment releases, the ground is removed from the selector S lead, thus opening the circuit for the SL relay 35, which thereupon restores and opens the circuit for the SD relay 27. However, this latter relay is slow to release and hence delays its release for a short interval of time so that during this interval a condition is established where the SD relay 27 is operated while the SL relay 35 is released. This results in the operation of the CC relay 37, which closes a circuit to the ST relay 23, locks in a circuit through its own armature 5, applies ground to the linefinder S lead at the same time removing the ground supplied from the operated contacts of the SD relay 27 and applies ground over its armature 6 to the ST lead.

The SD relay 27 finally restores and opens the original operate path to the CC relay 37, placing this CC relay under control of its holding circuit. The circuit continues to function as hereinabove described except that −110 volt coin refund potential is applied to the paystation line since the SR–1 relay 42 is not operated at this time.

*Long line adapter circuit*

The long line adapter circuit for prepay paystations is provided for use in lines where the loop resistance exceeds a given value and is inserted in the line before the conventional line circuit. Its principal functions are to seize the line circuit before the deposit of a coin, to switch through for ringing and coin control, to mark the succeeding paystation adapter circuit to take over certain functions otherwise performed by the prepay paystation adapter circuit and to provide impulse correction necessary where the loop circuit is of high resistance.

*Detailed description—Call to paystation—Seizure*

When this circuit is seized on a call to the paystation, ground on the SN lead provided over a connector circuit operates the SN relay 50 and this relay in operating opens the circuit for the LS relay 51, locks itself on the SN lead ground, and closes ground through the upper winding of the CB relay 53 to the T lead to the substation and battery through the lower winding thereof to the R lead to the substation.

*Ringing*

To ring the paystation, interrupted generator is connected to the T and R leads of the paystation line and low resistance battery is connected to the HS lead to operate the CT relay 15. The operation of the CT relay establishes a battery connection through resistor 54 to energize the RU relay 55. The operation of the RU relay connects the paystation T and R lines to the T and R lines from the connector so that the interrupted generator current will ring the paystation bells.

*Answer*

When the party at the paystation answers the call, a loop on the T and R leads energizes the CB relay 53. The operation of the CB relay energizes the release delay RD relay 56 and this in turn locks the SN relay 50 to the SN lead. The RD relay 56 closes the paystation T and R leads through capacitors 57 and 58 respectively for transmission purposes. The RD relay 56 also closes a loop across the connector T and R leads through the RE relay 59 in parallel with a resistor 60 and through the operated contacts of the RD relay 56 and disconnects the path from the RU relay 55 through the capacitor 61 from the R lead. The RE relay 59 in operating opens the circuit of resistor 60. The loop on the connector T and R leads trips the ring so that the calling and paystation parties may talk.

*Flash and release*

The paystation party may flash the calling party in the normal manner to momentarily open the calling T and R leads.

The calling party releasing first has no effect on this circuit as the SN ground is not opened so long as the connector is held by the RE loop on the T and R leads.

When the paystation party releases, the T and R loop is opened to restore the CB relay 53 and this relay, in restoring, releases the RD relay 56. The RD relay, releasing after a time period, opens the T and R leads to restore the connector and opens the transmission capacitor leads. The connector in restoring, opens ground from the SN lead to restore the SN relay 50 and this relay in restoring, opens the paystation T and R leads from the CB relay 53 and reconnects them in their normal manner. The circuit is now normal and is available for further use.

*Detailed description—Call from paystation—Seizure*

When this circuit is seized on a call from a paystation without coin insertion, the LS relay 51 operates from ground on armature and back contact of the CB relay 50, armature and back contact of the RD relay 56, armature and back contact of the CD relay 62, winding of the LS relay 51, back contact and armature of the SW relay 50, back contact and armature of the RU relay 56, T wire to the substation, R wire from the substation, armature and back contact of the RU relay 56, armature and back contact of the SN relay 50 and thence through the winding of the CD relay 62. This latter relay does not operate with only the winding of the LS relay 51 included in its circuit. It will be seen hereinafter that a coin must be deposited to bring about the operation of the CD relay 62.

The operation of the LS relay 51 causes the operation of the LS–1 relay 63, and this latter relay closes a loop from the line circuit T lead, the winding of the RE relay 59, presently in parallel with the resistance 60, armature and back contact of the PC–2 relay 64, front contact and armature of the LS–1 relay 63, armature and back contact of the SH relay 65 to the line circuit R lead. The LS relay 51, responding to premature pulsing, if any, has no effect on this loop circuit since the LS–1 relay 63 is slow releasing and does not restore during such pulsing, thus maintaining the circuit to the selector established through the line circuit, the line finder and the prepay paystation adapter circuit to the selector. After this loop circuit is established by the operation of the LS–1 relay 63 and the selector has been seized, a ground returned from the selector over its S lead to the line circuit SN lead is extended through an armature and back contacts of the RD relay 56, an armature and front contacts of the LS relay 51 and thence through the winding of the NC relay 66 to battery. The NC relay operates and locks directly to the line circuit SN lead until the LS relay 51 restores and the CD relay 62 operates.

When a coin is deposited at the substation, ground supplied through the winding of the coin disposal relay is applied to the CD relay 62 to cause its operation, whereupon the LS relay 51 is restored, opening the operate circuit of the NC relay. The operation of the CD relay 62 opens the locking circuit of the NC relay 66 and hence this relay also restores. The SN relay 50 is now operated from the SN lead through the armatures and back contacts of the NC relay 66 and the LS relay 51. The SN relay will presently lock through its own armature and front contact and the operated contacts of the RD relay 56 directly to the SN lead.

The operation of the SN relay 50 closes the paystation loop to the CB relay 53, connecting the grounded upper winding thereof on the T lead and the battery connected lower winding thereof on the R lead. The calling bridge CB relay 53 operates and causes the operation of its first slow RD relay 56. This latter relay, operating, retains the loop through the RE relay 59 connected to the selector under control of the pulsing contacts controlled by the PC–2 relay 64. The RD relay 56 closes the transmission capacitors 57 and 58 between the paystation lines and the selector, locks the SN relay 50 to the SN lead and closes preparatory circuits for impulsing the selector.

*Impulsing*

This circuit is now prepared for impulsing any desired digit required by the paystation party. The impulses transmitted from the paystation are corrected within this circuit to a standard percent make value by the pulse correction relays before being repeated to the succeeding equipment.

The CB relay 53, restoring on the first impulse, opens the circuit to the RD relay 56 and closes a circuit to the armature and front contact of the RD relay 56, armature and back contact of the PC–2 relay 64 to the upper winding of the PC–1 relay 67 and thence to battery. The PC–1 relay 67 in operating energizes the slow releasing SH relay 65, closes an adjustable resistor in series with its lower winding to delay the release of the PC–1 relay as required for the desired percent make and closes ground to the lower winding of the PC–2 relay 64.

The operation of the SH relay 65, opens the transmission capacitors, shunts the RE relay 59 which thereupon bridges the resistor 60 across its winding and closes a high resistance from the back contact of the CB relay 53 to the lower winding of this relay to slow its release during impulsing as a partial compensation for the long paystation loop.

When the CB relay 53 reoperates at the end of the first impulse, ground is again connected to the RD relay which remains operated due to its slow release characteristics.

The CB relay 53 in reoperating, also opens the shunt from the winding of the PC–2 relay 64, so that this relay now operates in series with the upper winding of the PC–1 relay 67. PC–2 relay 64 opens the original operating circuit from the back contact of the CB–1 relay and opens the upper winding of the PC–1 relay 67 whereby this relay will release after a precisely timed interval. In the meantime, ground is maintained on the lower winding of the PC–2 relay 64 and this relay remains operated through its two windings in series.

The PC–2 relay in operating, closes a ground to the locking circuit of the RD relay 56 to hold this relay and opens the PC–2 relay dialing contacts, to step the succeeding equipment toward the called line.

The PC–1 relay, restoring after the said precisely timed interval, opens the ground connection to restore the PC–2 relay 64, opens its shunted lower winding, and opens ground to restore the SH relay 65 if no other impulses follow to keep it operated.

The PC–2 relay 64 thereupon restoring, recloses the T and R loop to the switching equipment, opens ground from the RD relay 56 and recloses the circuit to the upper winding of the PC–1 relay to the impulsing contact of the CB relay 53 ready for the next impulse, if any.

The SH relay 65 in restoring after the last impulse of the train, opens the high resistance impulsing shunt to the winding of the CB relay 53, opens the shunt across the RE relay 59 and recloses the transmission capacitors between the calling and the called parties.

*Called party answers*

Succeeding impulses are similarly repeated by the PC–1 and PC–2 relays until the required destination is reached. When the called party answers, the transmission capacitors in this circuit permit conversation between the calling and called parties as required.

*Release*

Called party release has no effect on the equipment used on this call. When the calling paystation party releases, the calling bridge CB relay 53 releases and after an interval measured by the slow releasing characteristics of the RD relay 56, this relay also restores. The PC–1 relay 67 and the SH relay 65 operate momentarily as before described while the RD relay is restoring but without effect at this time. The restoration of the RD relay 56 releases the SN relay 50, opens the transmission capacitors and opens the loop to the succeeding equipment to release such equipment. This circuit is now restored to normal, ready for succeeding calls.

*Connector*

FIGS. 9 to 14 inclusive arranged as indicated in both

FIGS. 15 and 16 form a complete schematic circuit diagram of a connector circuit arranged for cooperation with both the prepay paystation adapter of FIGS. 6, 7 and 8 and the long line adapter circuit of FIGS. 4 and 5.

The principal functions of this connector may be shortly stated, as follows.

(1) It is a combination local and toll, two digit connector arranged as shown herein for terminal per line operation.

(2) It provides reverse battery and HS supervision, that is, the answer of the called party results in the reversal of battery fed back to the calling party and at the same time resistance battery is connected to the HS lead for supervisory purposes.

(3) The connector as shown herein provides for immediate ring on switch through and has circuitry for reringing a paystation.

(4) Toll marking, paystation re-ring and flash busy signals are transmitted over the HS lead.

(5) This connector is arranged for operation with the paystation long line adapter.

(6) Provides for the transmission of 60 IPM busy tone through the answering bridge relay coils winding and 60 IPM flash busy over the HS lead if the called line is found to be busy.

(7) This switch seizes the called line after the second digit if it is found free.

(8) Starts ringing and ringback tone immediately upon line seizure on calls from both local and toll.

(9) The connector is arranged for last party release.

(10) Provision is made for flash busy signaling by switching the HS lead to common 60 IPM battery lead which is alternately connected to ground and to battery at 60 IPM.

(11) Means is provided to prevent re-ring on closed line loop.

(12) Means is provided for automatic coin collect on release on calls from a toll operator to paystation level.

(13) Provides for supervisory alarms if one party disconnects but the other does not on completed calls.

(14) Switches the T and R through for coin control on calls from toll when the operator operates the coin control key causing —48 volt resistance battery to be forwarded over the HS lead and coin battery to be applied to the T and R.

*Detailed description—Seizure*

When this circuit is seized from the selector, a T and R loop is closed to the CB relay 70, over back contacts of the answering bridge AB relay 71. The CB relay 70 operates, closes a circuit to the RD relay 72 and prepares a circuit to the CB–1 relay 73. The RD relay operates and, through its armature 1, prepares part of the impulsing path to the XD relay 74 and the X magnet 75, connects ground to the right hand terminal of the lower winding of the SW relay 76 through its armature 3, prepares the circuit for applying battery to the ring wiper lead and applies ground to the master ground circuit 77 from which the lower windings of the XD relay 74 and the YD relay 80 are now energized, the XD relay 74 through the presently closed XON contact 78 and the YD relay 80 through the presently closed YON switch 79. The RD relay 72, through its armature 6 also grounds the selector S wire 81, to hold the preceding equipment and to mark this circuit as busy to other calls.

The energization of the XD relay 74, prepares the coin collect voltage path by closing its armature 1, prepares the impulsing path by the operation of its armature 2 whereby the upper winding of the XD relay 74 and the X magnet are connected to the back contact of the CB relay 70 and prepares a circuit for the RA relay 82 under control of the YON switch 79. The XD relay also closes a direct circuit to the MON lamp to provide a bright lamp on seizure, prepares part of the operate path to the CC–1 relay 83, and connects an alternate ground to the selector bank S lead 81.

The operation of the YD relay 80 completes the impulsing path to the upper winding of the XD relay 74 and the X magnet 75, connects the BT relay 84 to the S wiper lead, disconnects the lower winding of the SW relay 76 from the S wiper lead and connects an alternate direct circuit to the MON lamp. The YD relay 80 also prepares a circuit to its lower winding under control of the TL relay 85 and further opens the BT lead.

The circuit is now ready for dialing, with the calling bridge relay, the release delay relay, the X magnet delay relay and the Y magnet delay relay operated.

*Dialing the first digit—X movement of the switch*

On the first impulse of the dial, the selector bank T and R loop is opened to restore the CB relay 70 and this closes the circuit to the XD relay 74 and the X magnet 75, temporarily opening the energizing circuit of the slow releasing RD relay 72. The X magnet operates, moving the switch one step in the X direction, operating the XON switch 78 and the OF switch 85. The switch 78 opens the master ground connection to the lower winding of the XD relay 74, leaving this relay under control of the dial pulses to its upper winding so that this relay will remain operated only until the train of pulses has terminated. Ground is now applied to the ST lead 87 by the XON switch 88.

At the end of the first impulse, the selector bank T and R loop is reclosed to again operate the CB relay 70. The remainder of the train of dial pulses moves the switch in the X direction and at the termination of this train the XD relay 74 will release and then enable the YD relay 80 and the Y magnet 89. The restoration of the XD magnet 74 opens the operating path to the RA relay 82, opens an alternate direct circuit to the MON lamp and removes alternate ground from the selector bank S lead.

*Dialing the second digit*

On the first impulse of the second digit, the selector T and R loop is opened to the CB relay 70 whereupon this relay restores and closes the circuit to the YD relay 8 and the Y magnet 89. The operation of the Y magnet moves the switch one step in the Y direction thus operating the YON switches. The switch 79 opens the circuit of the lower winding of the YD relay 80 thus leaving this slow releasing relay dependent on the following impulses of the train constituting the second digit. At the end of the first impulse of the second digit, the selector bank T and R loop is reclosed to the CB relay 70 and this relay reoperating, recloses the circuit to the RD relay 72 and opens the circuit to the YD relay 80 and the Y magnet 89. The remainder of the series of dial impulses moves the switch in the Y direction to the desired called line terminals.

The YD relay 80 and the RD relay 72 remain operated during dial impulsing due to their slow releasing characteristics. At the end of the series of impulses, the selector T and R loop remains closed to the CB relay 70. This relay remains operated, thus opening the circuit to the YD relay 80 and the Y magnet 89 and the RD relay 72 remains operated. In time, the YD relay 80 restores, opens the impulsing path, transfers the S wiper lead from the winding of the BT relay 84 to the left hand terminal of the lower winding of the SW relay 76 which may then be traced to ground on armature 2 of the RD relay 72, opens the circuit extinguishing the MON lamp and prepares the BT lead. Thus at the end of the train of pulses constituting the second digit and during the release time of the YD relay 80, a busy test circuit is established from the S wiper of the switch, the alternate contacts of armature 2 of the YD relay 80, back contact of armature 6 of the SW relay 76, to the busy test BT relay 84 and thence to battery. During the release time of the YD relay 80 the test for the idle or busy condition of the called line is made.

*Busy line*

If the called line is busy, ground appearing on the S wiper and terminal closes a circuit to the BT relay 84 and this relay operates, prepares the circuit for applying busy tone to the calling line, closes a direct circuit to the MON lamp, prepares the circuit for applying 60 IPM resistance battery to the selector HS lead, locks in a circuit through its own armature 1 to ground supplied by armature 2 of the RD relay 72 and opens the right hand terminal of the lower winding of the SW relay 76 to prevent the operation of this relay.

The YD relay restores, closes the holding circuit to the BT relay 84, disconnects the TL relay 100 from the selector bank HS lead, and applies 60 IPM resistance battery to the selector bank HS lead giving a busy line indication to a toll operator if the call originates from toll. The restoration of the YD relay 80 also removes an alternate direct circuit from the MON lamp, applies busy tone via the BT lead through armature 5 of the BT relay 84 to the upper winding of the AB relay 71, the tip circuit transmission capacitor 90 and the normal contacts of the AB relay 71 to the calling line, thus giving a busy indication to the calling party.

*Release from busy line*

Upon hearing busy tone, the calling party disconnects, thus opening the T and R loop to the CB relay 70 which thereupon restores and opens the circuit to the RD relay 72. This latter relay restores, opens the holding circuit to the BT relay 84, connects the RA lead to the Z magnet 91 and removes ground from the selector bank S lead, thus releasing the preceding equipment.

The BT relay 84 restores, opens the BT lead removing busy tone from the line, opens the circuit to the MON lamp, reconnects the TL relay 100 to the selector bank HS lead and removes 60 IPM resistance battery from the selector bank HS lead.

The Z magnet 91 operates from the resistance ground present on the RA lead releasing the switch and operating the Z magnet contacts.

The operated Z magnet contacts connect ground to the selector bank S lead to mark this switch as busy during the release thereof. When the switch returns to normal, the YON switches and the XON switches restore and the circuit to the Z magnet becomes open. The Z magnet restores and ground is removed from the selector bank S lead. The circuit is restored to normal and is now available for other calls.

*Called line idle—Switch through*

Absence of ground on the S wiper lead at the busy test period signifying an idle line, prevents the operation of the BT relay 84. Hence when the YD relay 80 restores, the SW relay 76 operates from the cut-off relay resistance battery on the S lead. This relay first operates its X contact to establish an operating circuit through its upper winding and directly to the master ground lead 77, and thereupon operates fully. The SW relay 76 connects the ground connected RT relay 92 to the tip wiper and tripping battery from armature 3 of the RD relay 22 to the R wiper lead. The SW relay 76 connects the BT relay 84 to the ground at the back contact of armature 4 of the RA relay 82 to cause the operation of the BT relay. The SW relay also prevents the BT relay 84 from disconnecting the TL relay 100 from the selector bank HS lead and applying 60 IPM battery to this lead during ringing, further opens the RA lead, removes alternate ground from the ST lead, shunts its lower winding and extends direct ground on the S wiper lead to the succeeding circuit. The SW relay 76 closes a direct circuit to the SW–1 relay 93, further opens the BT lead, applies ground to the left hand terminal of the upper winding of the AB relay 71 preparing the transmission circuit and prepares the circuit for applying ringback tone to the ring of the calling line.

The SW–1 relay 93 operates and connects the PS–1 relay 94 to the X wiper lead and closes a direct circuit to the MON lamp.

The operation of the BT relay 84 applies ringing current to the called line.

*Ringing*

When the BT relay 84 is held operated, interrupted generator and trip battery are connected to the R and T wipers for signaling on the called line.

*Called party answers*

When the called party answers, the telephone handset removed from the hookswitch causes a T and R loop to be connected across the called line to operate the RT relay 92, from superimposed D.C. battery, if within a ringing period, and from trip battery, if within a silent period. The operation of the RT relay 92 closes a circuit from master ground lead 77 to the RA relay 82 and this latter relay operates to its X preliminary contact making a holding contact for itself in place of the contact closed by the RT relay. The RA relay removes ringback tone through the capacitor 95 from the calling line connected to armature 13 of the SW relay 76 and connects the lower winding of the AB relay 71 to the R wiper lead, thus closing a loop circuit to the AB relay. The RA relay 82 disconnects the T wiper lead from the RT relay 92, disconnects ringing at the back contact of armature 2 of the RA relay 82, connects the T and R leads to the transmission condensers 90 and 96, opens the circuit for the BT relay 92, removes ground from the ST lead and prepares ground for the SR–1 lead.

The answering bridge AB relay 71 operates, transfers the selector bank T and R leads to reverse the battery to the calling line, thus giving the calling party answer supervision, closes a circuit to the AA relay 97 and connects an alternate ground through its armature 4 to the master ground circuit 77.

The BT relay 84 restores, shunts the lower winding of the SW relay 76, removes alternate direct circuit from the MON lamp and further opens the GEN and BT leads.

The RT relay 92 restores, opens the original operate path to the RA relay 82 thus placing the RA relay under control of its master ground holding circuit.

The AA relay 97 operates, connects the PS relay 98 to the X wiper lead, prepares the circuit for applying ground to the SR–2 lead, transfers the selector bank HS lead from resistance ground connection at the back contact of armature 3 of the AA relay 97 to the front contact thereof and thence to battery on armature 3 of the RD relay 72, giving answer supervision to the operator when the call is from toll. Thus armature 3 of the AA relay 97 constitutes a switch to change the selector bank HS terminal from ground, indicating that the called party has not yet answered, to battery to indicate that such called party has responded. The AA relay 97 also transfers the MON lamp to a resistance circuit by removing the shunt from about resistance 99 to provide a dim lamp during the talking period. The AA relay 97 also opens the SR–1 lead. It is noted that the TL relay 100 does not operate at this time since it is differentially wound and the energization of its two windings are in opposition.

Conversation takes place over the T and R leads of the calling line, through the transmission capacitors 90 and 96 and the T and R leads of the line to the called party.

*Release—last party*

This circuit capable of adjustment for either calling party release or last party release is shown herein as wired for last party release.

When the calling party disconnects the T and R selector loop is opened to the CB relay 70 and this relay restores, opens the circuit to the RD relay 72, connects ground from the overflow switch 85 to the SR–2 lead to energize the supervisory signal circuit for a called party delay alarm. The RD relay 72 restores, removes ground from the right hand terminal of the lower winding of the SW relay 76, transfers the selector bank HS lead from resistance battery through armature 3 of the RD relay 72 to resistance ground through both windings of the TL relay 100, and transfers the master ground circuit 77 to control of the AB relay 71 through its armature 4. The RA relay 82 and the SW relay 76 remain locked to the master ground circuit 77. The restoration of the RD relay closes a circuit to the lower winding of the XD relay 74, extends the RA lead to control of the SW relay 76 and removes ground from the selector bank S lead 81 thus releasing the preceding equipment.

The XD relay 74 reoperates, reconnects a direct circuit to the MON lamp to provide a bright lamp on disconnect, and reapplies ground to the selector bank S terminal 81 thus marking the access busy while the circuit is held by the called party. Thus it will be seen that when the calling party is first to release, there is a momentary disconnection of ground from the sleeve terminal between the release of the RD relay 72 and the following reoperation of the XD relay 74 to provide for release of the preceding equipment but still providing a bar to the seizure of the connector until released by the called party. The circuit is held until the called party disconnects.

When the called party disconnects, the switch wiper T and R line loop is opened to the AB relay 71 and this relay restores, restores the selector bank T and R terminals to normal battery and opens the circuit to the AA relay 97, disconnects ground from the master ground wire 77 thus opening the holding circuits for the XD relay 74, the RA relay 82 and the SW relay 76.

The AA relay 97 restores, disconnects the PS relay 98 from the X wiper, disconnects the SR–2 lead thus deenergizing the timed delay supervisory signal circuit, closes an alternate direct current to the MON lamp and momentarily grounds the SR–1 lead without effect at this time. The XD relay 74 remains operated for a short period due to its slow release characteristics.

The SW relay 76 restores, opens the T and R wiper leads, prevents reoperation of the BT relay 84 when the RA relay 82 restores, maintains the connection of the TL relay 100 to the selector HS terminal and connects the Z release magnet 91 to the RA lead. The release of the SW relay 76, restores the SW–1 relay 93, removes ground from the S wiper thus releasing the succeeding line circuit cut-off relay returning the line circuit to normal and disconnects the AB relay 71.

The RA relay 82 restores and removes ground from the SR–1 lead. The SW–1 relay 93 restores, opens an alternate direct circuit to the MON lamp and disconnects PS–1 relay 94 from the X wiper lead.

The Z magnet operates from resistance ground present on the RA lead thus allowing the switch to release its wipers to normal. The operated Z magnet springs apply alternate ground to the selector S terminal to maintain the access to this switch busy until the switch is fully restored. The XD relay 72 restores, opens the circuit extinguishing the MON lamp and removes alternate ground from the selector S terminal.

When the switch restores to normal, the YON and XON switches restore and open the circuit to the Z magnet 91. Upon the complete restoration of the Z magnet, the return of the Z magnet springs removes the ground from the selector bank S lead and leaves the connector completely restored and available for other calls.

*Called party disconnects first*

When the called party disconnects first, the T and R loop holding the AB relay 71 is opened and this answering bridge relay restores, returning the selector bank T and R leads to normal battery thus giving the calling party disconnect supervision. The circuit to the AA relay 97 is opened and a ground is disconnected from the master ground circuit 77 thus placing this wire under the control of the calling party. The AA relay 97 restores, disconnects the PS relay 98 from the X wiper lead, disconnects the SR–2 lead, transfers the selector bank HS lead from resistance battery to resistance ground for toll operator disconnect supervision, closes a direct circuit to the MON lamp to provide a bright lamp on disconnect and connects ground to the SR–1 lead to energize the calling party delay alarm signal circuit. The circuit is held in this condition until the calling party disconnects.

When the calling party disconnects, the selector T and R loop is opened to the CB relay 70, which thereupon restores and opens the circuit to its release delay RD relay 72. The RD relay 72 restores after a period measured by its slow releasing characteristics and opens the master ground circuit 77, thus opening the holding circuits of the RA relay 82 and the SW relay 76. It extends the RA lead to control of the SW relay 76 and removes ground from the selector bank S lead, thus releasing the preceding equipment.

The SW relay restores, opens the T and R wiper leads, prevents reoperation of the BT relay 84 when the RA relay 82 restores, maintains connection of the TL relay 100 to the selector HS terminal and connects the Z release magnet 91 to the RA lead. The release of the SW relay also removes ground from the S wiper lead thus releasing the seized equipment and opens the circuit of the SW–1 relay 93.

The RA relay 82 restores, and removes ground from the SR–1 lead thus de-energizing the calling party delay alarm signal circuit. The SW–1 relay 93 restores and opens the circuit extinguishing the MON lamp and disconnects the PS–1 relay 94 from the X wiper lead. The Z magnet operates from resistance ground present on the RA lead allowing the switch to restore to normal. The operated Z magnet 91 springs re-apply ground to the selector bank S lead to mark this connector as busy during the release of the switch.

When the switch restores to normal, the YON and XON switches move to their normal position thus opening the circuit to the Z magnet, whereby the circuit is restored to normal and is now available for other calls.

*Call to paystation*

When a paystation is called, the circuit will function as hereinbefore described except that on switch through when the SW–1 relay 93 operates, a circuit will be closed to the PS–1 relay 94 by the finding of a ground connection by the X wiper, the ground connection 101 being used to indicate that paystations are served by that particular level. The PS–1 relay 94 operates and disconnects the HS wiper lead from a connection to ground on the back contact of the PS–1 relay armature to a front contact on armature 2 of the CC–1 relay 83 where resistance battery is available.

When the called paystation telephone is answered, the circuit functions as hereinbefore described except that when the AA relay 97 operates a circuit is closed to the PS relay 98 through armature 1 of the AA relay to the ground 101 found by the X wiper. The PS relay 98 operates, locks to the X wiper independent of the AA relay and prepares the +110 volt (collect) lead. The PS relay connects alternate ground to the master ground circuit 77, closes an alternate holding circuit to the RA relay 82 and also prepares a circuit for the CC–1 relay 83, from a back contact of armature 4 of the AB relay 71. The circuit is held until the called paystation party disconnects.

When the called paystation party disconnects, the answering bridge AB relay 71 restores as described hereinbefore and also closes a circuit to the CC–1 relay 83 which operates and connects resistance battery to the HS wiper lead providing coin control supervision and this relay in turn closes a circuit to the CC relay 102.

The AA relay 97 restores as described hereinbefore, opening an alternate path to release the PS relay 98 whereby the master ground holding circuit is opened. This in turn releases the RA relay 82. The CC relay 102 responds to the operation of the CC-1 relay 83, disconnects the windings of the AB relay 71 from the T and R wiper leads, shunts the T and R wiper leads and places +110 volt (collect) potential thereon by way of operated contacts of armature 1 of the XD relay 74, normal contacts of the CS relay 103 and operated contacts of the PS relay 98 to cause collection of a deposited coin at the called paystation telephone. The CC relay 102 opens the holding circuit for the PS relay 98 and connects an alternate ground to the master ground circuit 77.

The PS relay 98 restores, removes +110 volt potential from the T and R wiper leads, places master ground under control of the CC relay 102, recloses a circuit for the reoperation of the RA relay 82 through operated contacts of armature 3 of the XD relay 74 and the YON switch 79. The CC-1 relay restores, removes resistance battery from the HS wiper lead and opens the circuit to the CC relay 102. This latter relay restores, removes the shunt from the T and R wiper leads, further disconnects the +110 volt lead and removes ground from the master ground circuit 77 opening the holding circuits for and releasing the XD relay 74, the RA relay 82 and the SW relay 76.

The circuit continues to function as hereinbefore described, except that, when the SW-1 relay 93 restores the circuit for the PS-1 relay 94 is opened and this relay is released.

If the called paystation party should disconnect first, the circuit will function as described except when the AA relay 97 restores the original operate path to the PS relay 98 is opened thus placing the PS relay under control of the CC relay 102 and the circuit will be held under control of the calling party. When thereafter, the calling party disconnects, the CB relay 70 restores followed shortly thereafter by the release of the RD relay 72, as described hereinbefore, except that the RD relay 72 on releasing closes a circuit from the lower winding of the XD relay 74 to the ground on the master ground wire 77 now supplied by operated armature 3 of the PS relay 98.

The XD relay 74 operates, prepares the +110 volt lead, reapplies ground to the selector bank S lead to mark this circuit as busy and closes a circuit to the CC-1 relay 83. The CC-1 relay operates, closing a circuit for the operation of the CC relay 102 and the circuit continues to operate as hereinbefore described.

*Detailed description—Toll*

On a toll call, the circuit functions as hereinbefore described with the following exceptions.

*Dialing*

During dialing, the selector HS lead is transferred from resistance ground to resistance battery by the toll marking provision in the toll circuit thus providing a circuit to the lower winding of the TL relay 100 and since the upper winding thereof is shunted by the master ground lead 77, this relay operates. The TL relay 100 prepares a circuit to the CC-1 relay 83, prepares part of the circuit to the CS relay 103, closes an alternate master ground circuit to the lower winding of the YD relay 80, closes a circuit to the TA relay 104 from master ground over the normal springs of the YON switch 79 and opens the ringing generator lead at its armature 1. The TA relay 104 operates and opens its own original operate path while locking through the normal contacts of the armature 4 of the AA relay 97 to the selector bank S lead. The TA relay 104 closes an alternate path for connecting the PS relay 98 to the X wiper lead, opens a master ground circuit to the front contact of armature 3 of the TL relay 100, opens an alternate operate path to the CC-1 relay 83 by its armature 4, disconnects the SR-1 lead and closes a circuit to the CB-1 relay 73. The CB-1 relay operates, prepares a holding ground circuit for the TA relay 104 and prepares a circuit to the CS relay 103.

On completion of each digit, resistance battery is removed from the selector bank HS lead by the preceding equipment thus allowing the TL relay 100 to release. This relay restores and opens the holding circuit allowing the YD relay to restore for preparing the circuit for switching through or for giving a busy line indication. Ringing will take place automatically if the called line is found idle.

*Busy line*

The circuit functions as hereinbefore described, excepting that when the CB relay 70 restores when the calling party (in this case the toll operator) disconnects, the CB-1 relay 73 is also released and when the RD relay 81 restores, the TA relay 104 is also released by the removal of ground from the selector bank S lead. Switch through and answer by the called subscriber are normal, as hereinbefore described, on release, when the calling party disconnects first the release of the CB relay 70 also releases the CB-1 relay 73 which in turn opens the holding circuit releasing the TA relay 104. When the called party disconnects first, the circuit functions as heretofore described except that when the AA relay 47 restores the holding circuit to the TA relay 104 is transferred to control of ground on the back S lead 81. When the calling party disconnects, releasing the CB relay 70 and the RD relay 72, the release of this release delay relay opens the holding circuit thus restoring the TA relay 104.

It may be noted that with certain alternate wiring changes, provision for which is made in this circuit, the controlled ring arrangement may be made whereby on such a toll call the application of ringing current to the called line is placed under control of the operator. By such means a called line may be seized if found idle and then and later have ringing current applied thereto at the will of the operator.

*Call to paystation—Coin control by operator*

If the call is to a paystation, the circuit will function as above described except on switch through, when the SW-1 relay 93 operates, a circuit will be closed to the PS-1 relay 94 from a ground 101 picked up by the X wiper. The PS-1 relay 94 operates, disconnects the HS wiper lead and prepares a circuit for applying resistance battery to this HS wiper lead when the CC-1 relay 83 operates. The circuit functions as heretofore described. When the called party answers, the operation of the AA relay 97 also closes a circuit to the PS relay 98 by ground present on the X wiper.

The PS relay 98 operates, prepares the +110 volt (collect) lead, closes an alternate circuit to itself independent of the AA relay 97, connects alternate ground to the master ground lead 77, prepares a circuit to the CC-1 relay 83 and prepares a circuit to the CS relay 103 under control of the TL relay 100.

On an overtime call, when the operator causes resistance battery to be applied to the selector HS lead by operation of the coin control key, a circuit is closed to the TL relay 100. The TL relay operates, closes a circuit to the CS relay 103 and prepares a circuit to the CC-1 relay 83. The CS relay 103 operates to its X preliminary make contacts first, connects a resistance holding bridge on the windings of the CB relay 70 through resistance 105 to hold this relay operated when the selector T and R leads are disconnected from the windings of the CB relay by the CS relay operating fully and connects a resistance holding bridge on the windings of the AB relay 71 by the resistance 106 to hold this answering bridge relay operated when the T and R wiper leads are opened to the windings of the AB relay by the operation of the CC relay 102. The CS relay 103 operates fully, shunts the T and R leads and extends them to control of the CC relay 102, disconnects the selector T and R leads from the windings of the CB relay 70, opens the +110 volt (collect) lead path, prepares a holding circuit to itself and closes a circuit to the CC–1 relay 83. The CC–1 relay operates, closes a circuit to the CC relay 102 and connects resistance battery to the HS wiper lead, providing coin control supervision.

The CC relay 102 operates, closes a holding circuit to the CS relay 103, connects alternate ground to the master ground circuit 77 and opens the alternate holding path to the PS relay 98. The CC relay 102 also disconnects the T and R wiper leads from the windings of the AB relay 71 and shunts the T and R wiper leads connecting them to the shunted selector bank T and R leads, thus placing the associated paystation under direct control of the toll operator for forwarding coin voltage to the paystation telephone as desired. When the coin control key is returned to normal, resistance battery is removed from the HS lead allowing the TL relay 100 to restore. The TL relay restores, opens the original operate path to the CS relay 103 and opens the circuit to the CC–1 relay 83. This latter relay restores, opens the circuit to the CC relay 102 and removes resistance battery from the HS wiper lead. The CC relay 102 restores, opens the holding circuit to the CS relay 103, removes alternate ground from the master ground circuit and recloses an alternate path to the PS relay 98. The CC relay 103 in restoring also removes the shunt from the T and R wiper leads, reconnecting the windings of the AB relay 71 to the T and R wiper leads and opens the tie to the shunted selector T and R leads, thus disconnecting the +110 volt lead.

The CS relay 103 restores, removes the shunt from the selector T and R leads, reconnecting the windings of the CB relay 70 to the selector T and R leads, opens the resistance loops to the calling and called bridge relays, thus placing these relays under control of the calling party (toll operator) and called party (paystation) respectively. The circuit will continue to function as described hereinbefore when the toll operator and the paystation party disconnect.

*Delay supervisory alarms*

Grounding of the SR–1 or SR–2 leads sets up a delay alarm circuit which causes sending of an alarm signal after a predetermined length of time, should one of the parties fail to release the circuit after disconnect by the other party.

What is claimed is:

1. In a dial telephone system, stations including regular stations and paystations each terminating in a line circuit, linefinder selector combinations for extending connections from said line circuits, other selective switches including connectors for further extending connections to other stations, a prepay paystation adapter circuit in each said linefinder selector combination in circuit between a linefinder and its associated selector, said adapter circuit including a pad circuit, said pad circuit including a paystation relay for differentiating between a line serving a regular subscriber station and a line serving a paystation and another relay for thereafter differentiating between lines serving one or another kind of paystation, said paystation relays controlling said prepay paystation adapter circuit, first to freely extend a connection from said linefinder to said selector, second to block the operation of said selector until a coin has been deposited at a said paystation, and third to disable said blocking means and to provide means for repeating dial pulses into said selector.

2. In a dial telephone system, stations including regular stations and paystations each terminating in a line circuit, linefinder selector combinations for extending connections from said line circuits, other selective switches including connectors for further extending connections to other stations, a prepay paystation adapter circuit in each said linefinder selector combination in circuit between a linefinder and its associated selector, means in each said line circuit for marking a conductor in said circuit to characterize the station connected thereto as a regular station or as one or another kind of paystation, said conductor being extended into said prepay paystation adapter circuit and means therein responsive to the said marking on said extended conductor to leave said prepay paystation completely unoperated on a call from a regular station, to operate means therein for blocking the operation of said associated selector on a call from one kind of paystation and to disable said blocking means on a call from another kind of paystation.

3. In a dial telephone system, stations including regular stations and paystations each terminating in a line circuit, linefinder selector combinations for extending connections from said line circuits, other selective switches including connectors for further extending connections to other stations, a prepay paystation adapter circuit in each said linefinder selector combination in circuit between a linefinder and its associated selector, tip, ring, sleeve and HS circuits through said line circuits, said linefinders, said selectors and said connectors, the said HS circuits in said line circuits being variously characterized to signal thereover the character of the station served thereby, means in said prepay paystation adapter circuits responsive to the said station characterization on the said HS conductor, first to leave said prepay paystation adapter circuit completely unoperated on a call from a regular station, second to block the operation of the associated selector on a call from a first kind of paystation until a coin has been deposited therein, and third to disable said blocking means on a call from another kind of paystation.

4. In a dial telephone system, stations including regular stations and paystations each terminating in a line circuit, linefinder selector combinations for extending connections from said line circuits, other selective switches including connectors for further extending connections to other stations, a prepay paystation adapter circuit in each linefinder selector combination in circuit between a linefinder and its associated selector, a long line adapter circuit for connection in a line between a substation and its individual line circuit to provide improved operation when the line resistance between said line circuit and its substation exceeds a predetermined value, tip, ring, sleeve and HS circuits in said line circuits, said linefinder selector combination circuits and said connector circuits, the said HS circuits in said line circuits being left open where the associated station is a regular station, being connected to a high resistance ground where the associated station is a paystation and being connected to a low resistance ground where a said long line adapter circuit is employed, control means in said prepay paystation adapter circuits operated over said HS conductor, said control means being unresponsive to a said open circuit provided by a regular station and being responsive to both a high resistance ground and a low resistance ground provided by a paystation line circuit, said control means including a marginal relay for differentiating between the said high resistance ground and said low resistance ground connected to said HS circuits in said paystation line circuits, means for said prepay paystation adapter to remain inert in the failure of said control means to operate, means in said prepay paystation adapter for blocking the operation of said selector responsive to the operation of said control means by the high resistance ground, means in said prepay paystation adapter circuit for preventing the blocking of the operation of said selector by said prepay paystation adapter circuit responsive to the operation of said control means by said low resistance ground, means in said long line adapter circuit operated over said low resistance HS connection for blocking the operation of said selector, and means in both said prepay paystation adapter circuit and said long line adapter circuit for disabling the blocking of said selector in response to the deposit of a coin in said paystation.

5. In a dial telephone system, stations including regular stations and paystations each terminating in a line circuit, linefinder selector combinations for extending connections from said line circuits, other selective switches including connectors for further extending connections to other stations, a prepay paystation adapter circuit in each linefinder selector combination in circuit between a linefinder and its associated selector, a long line adapter circuit for connection in a line between a substation and its individual line circuit to provide improved operation when the line resistance between said line circuit and its substation exceeds a predetermined value, tip, ring, sleeve and HS circuits in said line circuits, said linefinder selector combination circuits and said connector circuits, the said HS circuits in said line circuits being left open where the associated station is a regular station, being connected to a high resistance ground where the associated station is a paystation and being connected to a low resistance ground where a said long line adapter circuit is employed, control means in said prepay paystation adapter circuits operated over said HS conductor, said control means being unresponsive to a said open circuit provided by a regular station and being responsive to both a high resistance ground and a low resistance ground provided by a paystation line circuit, said control means including a marginal relay for differentiating between the said high resistance ground and said low resistance ground connected to said HS circuits in said paystation line circuits, means for said prepay paystation adapter to remain inert in the failure of said control means to operate, means in said prepay paystation adapter for blocking the operation of said selector responsive to the operation of said control means by the high resistance ground, means in said prepay paystation adapter circuit for preventing the blocking of the operation of said selector by said prepay paystation adapter circuit responsive to the operation of said control means by said low resistance ground, means in said long line adapter circuit operated over said low resistance HS connection for blocking the operation of said selector, means in both said prepay paystation adapter circuit and said long line adapter circuit for disabling the blocking of said selector in response to the deposit of a coin in said paystation, and pulse correction means in said long line adapter circuit for reshaping and retiming dial pulses subject to mutilation in transmission over said high resistance circuit between said paystation and its long line adapter circuit.

6. In a dial telephone system, stations including regular stations and paystations each terminating in a line circuit, linefinder selector combinations for extending connections from said line circuits, other selective switches including connectors for further extending connections to other stations, a prepay paystation adapter circuit in each said linefinder selector combination in circuit between a linefinder and its associated selector, means in said prepay paystation adapter circuit responsive to the extension of a connection thereto from a paystation line, means in said connector circuit responsive to a connection therefrom to a paystation line, a long line adapter circuit in each paystation line in circuit between a station and its said line circuit to reshape and retime dial pulses transmitted to said selective switches, blocking means in both said prepay paystation adapter circuit and said long line adapter for rendering a said selector unresponsive to dial pulses transmitted from a paystation, coin detection means in both said circuits for disabling said blocking means, means in said prepay paystation adapter circuit for detecting the inclusion of a said long line adapter circuit in an established connection and means responsive to said detecting means for transferring the said dial pulse blocking function from said prepay paystation adapter circuit to said long line adapter circuit.

7. In a dial telephone system, stations including regular stations and paystations each terminating in a line circuit, linefinder selector combinations for extending connections from said line circuits, other selective switches including connectors for further extending connections to other stations, a prepay paystation adapter circuit in each said linefinder selector combination in circuit between a linefinder and its associated selector, a long line adapter circuit for inclusion in high resistance loop paystation lines between the said stations and their said line circuits, said long line adapter circuit having pulse correction, pulse blocking and coin detection circuits, pulse blocking and coin detection circuits in said prepay paystation adapter circuits, and means responsive to the use of a said pulse blocking circuit in a said long line adapter circuit for disabling a said pulse blocking circuit in a said prepay paystation circuit and means responsive to said coin detection circuits for disabling said pulse blocking circuits.

References Cited in the file of this patent

UNITED STATES PATENTS

| | | |
|---|---|---|
| 2,615,092 | Lomax | Oct. 21, 1952 |
| 2,655,558 | Kessler | Oct. 13, 1953 |
| 2,831,924 | Lomax | Apr. 22, 1958 |